(12) United States Patent
Zhodzishsky et al.

(10) Patent No.: US 8,319,683 B2
(45) Date of Patent: Nov. 27, 2012

(54) BASE DATA EXTRAPOLATOR TO OPERATE WITH A NAVIGATION RECEIVER IN REAL-TIME KINEMATIC (RTK) AND DIFFERENTIAL GLOBAL POSITIONING SYSTEM ( DGPS) MODES

(75) Inventors: Mark I. Zhodzishsky, Moscow (RU); Victor A. Veitsel, Moscow (RU); Vladimir Beloglazov, Moscow (RU); Roman Nevzorov, Moscow (RU)

(73) Assignee: Topcon GPS, LLC, Oakland, NJ (US)

( * ) Notice: Subject to any disclaimer, the term of this patent is extended or adjusted under 35 U.S.C. 154(b) by 457 days.

(21) Appl. No.: 12/579,485

(22) Filed: Oct. 15, 2009

(65) Prior Publication Data

US 2010/0103032 A1    Apr. 29, 2010

Related U.S. Application Data

(60) Provisional application No. 61/197,233, filed on Oct. 24, 2008.

(51) Int. Cl.
*G01S 19/43* (2010.01)
(52) U.S. Cl. ................................. 342/357.26
(58) Field of Classification Search .............. 342/357.26
See application file for complete search history.

(56) References Cited

U.S. PATENT DOCUMENTS

| 6,674,399 B2 | 1/2004 | Zhodzishky et al. |
| 2005/0001762 A1 | 1/2005 | Han et al. |

OTHER PUBLICATIONS

Stone, J. et al., Carrier Phase Model for Satellites and Pseudolities, Proceedings of the 12th International Technical Meeting of the Satellite Division of the Institute of Navigation ION GPS, 1999, Sep. 14, 1999, pp. 1509-1515.
Zhodzishsky, M. et al., "Real-Time Kinematic (RTK) Processing for Dual-Frequency GPS/GLONASS", Proceedings of the 11th International Technical Meeting of the Satellite Division of the Institute of Navigation ION, USA, pp. 1325-1331.
International Search Report corresponding to PCT Application No. PCT/IB2009/007139 filed Oct. 15, 2009 (4 pages).
Written Opinion of the International Searching Authority corresponding to PCT Application No. PCT/IB2009/007139 filed Oct. 15, 2009 (7 pages).
Neumann, J. et al., "Test Results from a New 2 cm Real Time Kinematics GPS Positioning System", The Proceedings of the 9-th International Technical Meeting of the Satellite division of the Institute of Navigation (ION GPS-96), 1996, pp. 873-882.

*Primary Examiner* — Jack W Keith
*Assistant Examiner* — Frank J McGue
(74) *Attorney, Agent, or Firm* — Wolff & Samson PC

(57) ABSTRACT

Base data received at a rover receiver is extrapolated to a rover measurement time referenced to a clock in the rover receiver. The base data comprises a plurality of base parameters, such as pseudo-ranges and full phases, calculated at base epochs from data received from navigation satellites. Base data is decomposed into a computed component, a common component, and an information component. Only the information component is extrapolated, thereby increasing the extrapolation time interval (during which base data are missing) over which an acceptable accuracy in determination of rover coordinates may be provided. The extrapolated base data is calculated by adding the computed component updated to the rover measurement time, the information component extrapolated to the rover measurement time, and the common component. A second-order recursive digital filter is used to generate the extrapolation function.

54 Claims, 11 Drawing Sheets

BASE DATA EXTRAPOLATOR TO OPERATE WITH A NAVIGATION RECEIVER IN REAL-TIME KINEMATIC (RTK) AND DIFFERENTIAL GLOBAL POSITIONING SYSTEM ( DGPS) MODES

This application claims the benefit of U.S. Provisional Application No. 61/197,233 filed Oct. 24, 2008, which is incorporated herein by reference.

BACKGROUND OF THE INVENTION

The present invention relates generally to global navigation satellite systems, and more particularly to a base data extrapolator to operate with a navigation receiver.

Global navigation satellite systems, such as the global positioning system (GPS), may determine locations with high accuracy. A navigation receiver receives and processes radio signals transmitted by satellites located within a line-of-sight distance of the receiver. The satellite signals comprise carrier signals modulated by pseudo-random binary codes. The receiver measures the time delays of the received signals relative to a local reference clock or oscillator. Code measurements enable the receiver to determine the pseudo-ranges between the receiver and the satellites. The pseudo-ranges differ from the actual ranges (distances) between the receiver and the satellites due to various error sources and due to variations in the time scales of the satellites and the receiver. If signals are received from a sufficiently large number of satellites, then the measured pseudo-ranges can be processed to determine the code coordinates and coordinate time scales at the receiver. This operational mode is referred to as a stand-alone mode, since the measurements are determined by a single satellite receiver. A stand-alone system typically provides meter-level accuracy.

To improve the accuracy, precision, stability, and reliability of measurements, differential navigation (DN) systems have been developed. A schematic of a DN system is shown in FIG. 1. Constellation 110 includes multiple navigation satellites; shown are four representative satellites, satellite 112-satellite 118. In a DN system, the position of a user is determined relative to a base station (also referred to as a base), designated base 130 in FIG. 1. Base 130 is generally fixed, or at least stationary, during measurements. Base 130 contains a navigation receiver that receives satellite signals 101 from constellation 110. The coordinates of base 130 are precisely known (by satellite positioning systems, other measurement schemes, or a combination of satellite positioning systems and other measurement schemes).

The user may also be fixed or stationary. In general, however, the user may be mobile, and is often referred to as a rover, designated rover 140 in FIG. 1. Rover 140 contains a navigation receiver that receives satellite signals 103 from constellation 110. Signal measurements processed at base 130 are transmitted to rover 140 via a communications link. The communications link, for example, may be provided over a cable or optical fiber. The communications link may also be a wireless link, designated wireless link 105 in FIG. 1. Rover 140 processes the measurements received from base 130, along with measurements taken with its own navigation receiver, to improve the accuracy of determining its position. Accuracy is improved in the differential navigation mode because errors incurred by the receiver at rover 140 and by the receiver at base 130 are highly correlated. Since the coordinates of base 130 are accurately known, measurements from base 130 may be used to compensate for the errors at rover 140. A differential global positioning system (DGPS) computes locations based on pseudo-ranges only.

The location determination accuracy of a differential navigation system may be further improved by supplementing the code pseudo-range measurements with measurements of the phases of the satellite carrier signals. If the carrier phases of the signals transmitted by the same satellite are measured by both the receiver in base 130 and the receiver in rover 140, processing the two sets of carrier phase measurements can yield a location determination accuracy to within several percent of the carrier's wavelength. A differential navigation system that computes locations based on real-time carrier signals is often referred to as a real-time kinematic (RTK) system.

To process measurements from base 130 and rover 140 in real time, two problems need to be resolved. The first problem is to reference the measurements at base 130 and the measurements at rover 140 to a common reference time base to properly compensate for highly-correlated errors that vary in time. Two approaches for solving this problem have been developed. In the first approach (referred to as the matched observation processing mode and also referred to as the delay mode), processing measurements at rover 140 are delayed until corresponding measurements from base 130 arrive. This approach is not well suited for fast mobile rovers, whose positions need to be determined at user-specified times.

In the second approach (referred to as the low-latency position processing mode and also referred to as the extrapolation mode), measurements from base 130 are extrapolated in advance to the instant when corresponding measurements from rover 140 are received. This approach yields more accurate results when determining the coordinates of rover 140 as a function of the time measured at rover 140. This approach is suitable for applications in which the time intervals between measurement updates of the coordinates of rover 140 are less than the time intervals at which measurements from base 130 are received by rover 140.

A second problem arises if the communications link between rover 140 and base 130 operates under deleterious conditions (such as low signal or high interference in wireless link 105). In some instances, transmission errors in the data transmitted from base 130 may not be properly corrected by the decoder in rover 140. In other instances, wireless link 105 may go down. Transmission of data from base 130 to rover 140 may be disrupted for extended periods of time; for example, tens of seconds or more. In these instances, prediction of base data by extrapolation can significantly increase the reliability of measuring the coordinates of rover 140.

Timing relationships are illustrated in FIG. 2. The horizontal axes represent time. Base time 220 represents time relative to the base clock (at base 130). Rover time 260 represents the time relative to the rover clock (at rover 140). In the example shown, base time 220 and rover time 260 are synchronized to a common system reference clock with high accuracy. The base epochs (time instants at which measurements are made at the base) are denoted $t_i$, where i is an integer $\geq 1$. Shown are six representative base epochs, $t_1$ 221-$t_6$ 226. The duration of the base epoch (that is, the time interval between two neighboring base epochs) is $T_{ep}^{base}$ 201. To simplify the discussion, in the example shown, the rover epochs $T_{ep}^{rov}$ 202 are the same as the base epochs (in general they may be different). The full phases $\phi_{i,j}$ (base) and pseudo-ranges $R_{i,j}$ (base) are measured at base 130 at base epochs $t_i$. Here j is the reference index of a specific satellite. The value j is an integer ranging from 1 to N, where N is the total number of satellites from which the navigation receiver receives signals.

The values of [$\phi_{i,j}$ (base), $R_{i,j}$ (base), $t_i$] are transmitted as base data to rover 140 across a communications link (such as wireless link 105 in FIG. 1) via communications devices, such as modems, installed at both base 130 and rover 140. Since a finite time is required for transmission of data between base 130 and rover 140, there is a delay between the time that base data is collected at base 130 and the time that the base data from base 130 is received in rover 140 (data processing time is considered to be negligible relative to the transmission delay). To simplify the discussion, in the example shown in FIG. 2, the delay, denoted as $\tau_d$ 203, is constant. In general, the delay may vary.

In the first approach discussed above, the full phases $\phi_{i,j}$ (rover) and pseudo-ranges $R_{i,j}$ (rover) are measured at rover 140 at times $t_i$. The values of [$\phi_{i,j}$ (rover), $R_{i,j}$ (rover), $t_i$] are stored as rover data in buffer memory at rover 140. The base data [$\phi_{i,j}$ (base), $R_{i,j}$ (base), $t_i$] from base 130 arrives at rover 140 with a delay $\tau_d$. Again, assuming that data processing time is negligible relative to delay $\mu_d$, rover 140 then post-processes, at data processing time $t_i'=t_i+\tau_d$, the combined base data taken at measurement time $t_i$ and rover data taken at measurement time $t_i$. For example, measurements taken at $t_1$ 221-$t_6$ 226 are processed at $t_1$ 261-$t_6$ 266, respectively.

In the second approach discussed above, the values of [$\phi_{i,j}$ (rover), $R_{i,j}$ (rover), $t_i$] taken at an instant $t_i=t_m$ are immediately co-processed with values of [$\phi_{i,j}^{ext}$ (base), $R_{i,j}^{ext}$ (base), $t_m$] extrapolated from values of [$\phi_{i,j}$ (base), $R_{i,j}$ (base), $t_i$] taken at instant $t_i<t_m$, which have previously arrived at rover 140. In this case, the information to the user (at rover 140) is outputted without delay. For example, at $t_4$ location coordinates are processed from values of [$\phi_{4,j}$ (rover), $R_{4,j}$ (rover), $t_4$] and from values of [$\phi_{4,j}^{ext}$ (base), $R_{4,j}^{ext}$ (base), $t_4$] extrapolated from values of [$\phi_{3,j}$ (base), $R_{3,j}$ (base), $t_3$] taken at instant $t_3$, which arrived at rover 140 at instant $t_3'<t_4$. In this case, the base data is predicted (extrapolated) over a single epoch.

This approach can operate even if the information from base 130 is absent over one or more epochs. For example, assume at $t_5$ that values of [$\phi_{3,j}$ (base), $R_{3,j}$ (base), $t_3$] have arrived at rover 140 at instant $t_3'<t_5$; however, values of [$\phi_{4,j}$ (base), $R_{4,j}$ (base), $t_4$] that should have arrived at rover 140 at instant $t_4'<t_5$ are missing (assume wireless link 105 in FIG. 1 was disrupted). In this case, at $t_5$, location coordinates are processed from values of [$\phi_{5,j}$ (rover), $R_{5,j}$ (rover), $t_5$] and from values of [$\phi_{5,j}^{ext}$ (base), $R_{5,j}^{ext}$ (base), $t_5$] extrapolated from values of [$\phi_{3,j}$ (base), $R_{3,j}$ (base), $t_3$]. In this case, the base data is predicted over two epochs. Since prediction errors increase as the extrapolation interval (also referred to as the prediction interval) increases, however, the maximum extrapolation interval is set to a user-defined value; for example, 30 s. The extrapolation interval is the difference between the current measurement time at rover 140 and the time at which the most recent available base data was taken.

Existing systems use different extrapolation techniques of varying complexity. Simple linear prediction, for example, can be efficient for short prediction intervals. Longer prediction intervals require statistical analysis of predicted processes determined by the instability of the reference oscillator (frequency reference) at base 140, the instability of the reference oscillators at the satellites, and variations in radio wave propagation. One existing extrapolator is based on a Kalman filter; an example is described in J. Neumann et al., "Test Results from a New 2 cm Real Time Kinematics GPS Positioning System," The Proceedings of the 9-th International Technical Meeting of the Satellite Division of the Institute of Navigation (ION GPS-96), 1996, pp. 873-882.

Another technique is described in U.S. Pat. No. 6,674,399. In this case, extrapolation is performed with a polynomial, the coefficients of which are determined and then corrected over the previous time interval (prior to extrapolation). A set of information parameters for each satellite channel is generated at the rover's modem output from the base data and recorded in the extrapolator register. Measured parameters of the communication link between the base and the rover, such as signal-to-noise ratio, and messages concerning errors that cannot be corrected are recorded in the register as well.

The recorded set of data is used to calculate the parameters of the extrapolation function in the form of a polynomial. In particular, a square polynomial describing the extrapolation function with three coefficients in the form of $At^2+Bt+C$ is applied, where t is the time and A, B, and C are coefficients of the extrapolation function. The coefficients of the extrapolation function are computed by least mean squares over the previous time interval. When there is an interruption in communications, base data is restored using the stored polynomial coefficients.

The accuracy of extrapolation depends not only on the time but also on the behavior of the extrapolated process. The slower this process is, the more accurate the extrapolation will be. What is needed is an extrapolator that is capable of predicting base data with high accuracy over long extrapolation intervals. In addition, an extrapolator that minimizes computational resources is advantageous.

BRIEF SUMMARY OF THE INVENTION

In an embodiment of the invention, base data received at a rover receiver is extrapolated to a rover measurement time referenced to a clock in the rover receiver. The base data comprises a plurality of base parameters, each specific base parameter in the plurality of base parameters corresponding to a specific navigation satellite selected from a plurality of navigation satellites and corresponding to a specific base epoch selected from a plurality of base epochs. For each specific navigation satellite and for each specific base epoch, a specific computed component is calculated. For each specific base epoch, a specific common component is calculated. For each specific navigation satellite and for each specific base epoch, a specific information component is calculated. For each specific information component, a specific extrapolation function is determined. For each specific information component, a specific extrapolated information component is extrapolated to the rover measurement time; the specific extrapolated information component is calculated from at least one base parameter received at the rover receiver prior to the rover measurement time and from the specific extrapolation function. For each specific navigation satellite, a specific updated computed component at the rover measurement time is calculated. For each specific navigation satellite, the extrapolated base data is calculated by adding the extrapolated specific information component at the rover measurement time, the updated computed component at the rover measurement time, and the common component. Extrapolated base data include base pseudo-ranges and base full phases.

These and other advantages of the invention will be apparent to those of ordinary skill in the art by reference to the following detailed description and the accompanying drawings.

DETAILED DESCRIPTION OF THE INVENTION

In an embodiment of the present invention, the accuracy of extrapolating data received from the base is increased, and the prediction time over which the differential navigation (DN) mode may proceed uninterrupted is increased, even in the absence of recent base measurements. In an embodiment of the invention, these improvements are performed by an extrapolator that does not predict the complete value of parameters (that is, full phase and pseudo-range) measured at the base; it predicts only those components of the values that contain information needed to compensate for correlated errors in the rover coordinate measurements. This method permits the computed component to be eliminated from the prediction, because this component can be calculated using data available at the rover by itself. This data does not need to be extrapolated since it can be calculated and subtracted at the rover.

The computed component includes the change in parameters [base data between two neighboring time instants (base epochs)] related to satellite movements. Satellites transmit parameters of their orbits which allow the satellite attitude to be defined at any time moment related to the satellite (on-board) clock. These parameters are received at the rover. In addition, at the rover, there are known base coordinates. A set of such parameters [base data according to base epochs, satellite orbit parameters, and known base position] allows the rover to compute the computed component according to each satellite.

From the remaining source differences, the component which is common for all the satellite channels may also be eliminated, because it does not affect coordinate estimates and influences just time offset estimates. The source differences refer to the differences resulting from subtracting the computed components from the measurements which have arrived from the base (the computed components are those known at the rover).

The main part of this common component is the phase drift of the reference oscillator at the base; the phase drift arises from the instability of the oscillator. The common component can be isolated for each time instant by averaging the source differences over all observed satellites. The remaining information component contains temporary fluctuations due to radio wave propagation, variations due to satellite clock drift, and errors due to inaccuracy of orbital parameters. These are the factors that should be predicted as accurately as possible, because they define correlated errors which are compensated in DN mode operation. The isolated information component changes much slower than the full value of the measured phase or pseudo-range; hence, it can be predicted by simpler means and be predicted more accurately over longer prediction intervals. In an embodiment of the invention, a first order polynomial is used for extrapolation.

Figure 3:
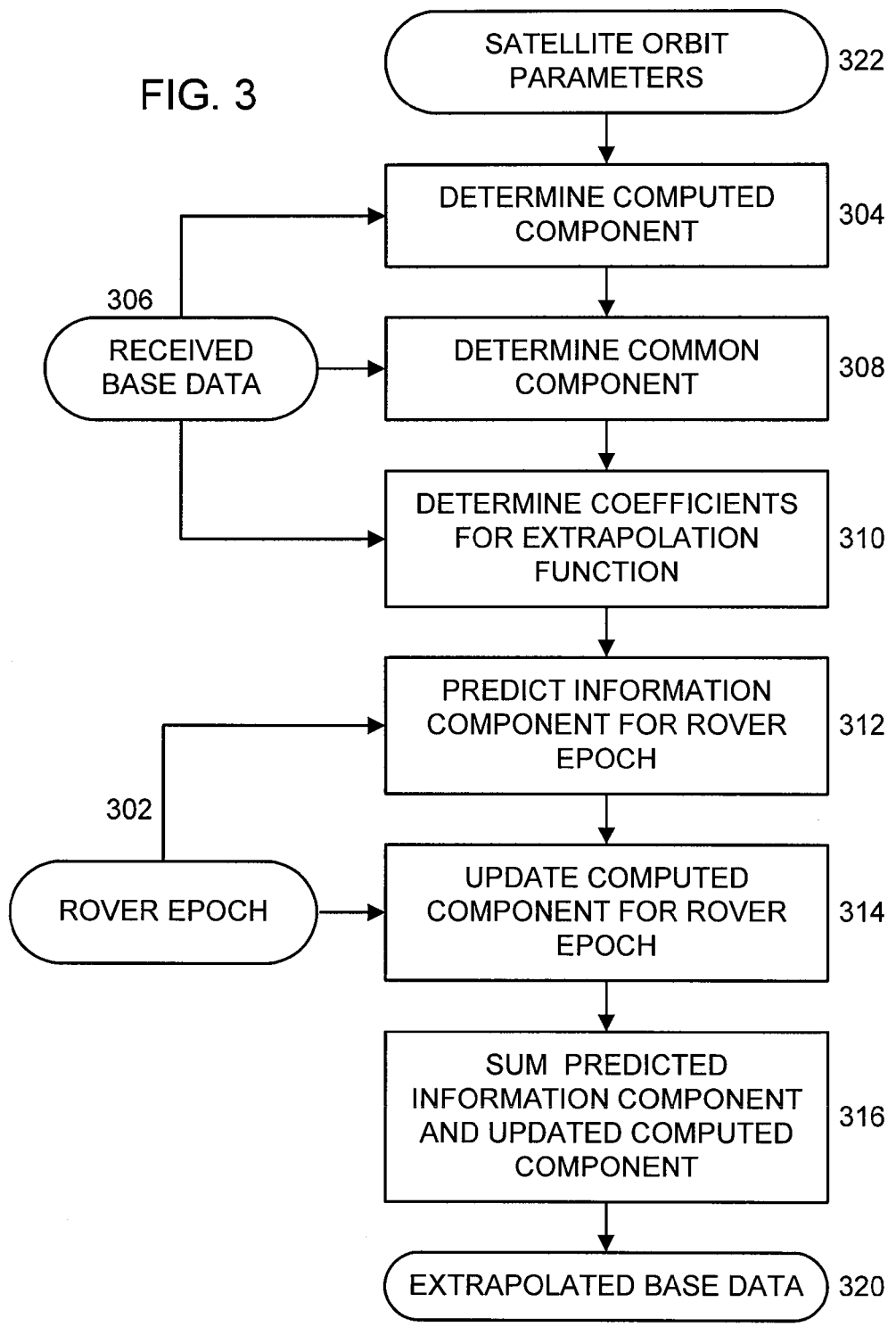
FIG. 3 shows a high-level flowchart of a method for extrapolating base data.

FIG. 3 shows a high-level flowchart of the extrapolation process according to an embodiment of the invention. A computational system for performing the extrapolation process is described in more detail below. The satellite orbit parameters 322 received at the rover are inputted into step 304. Received base data 306 is also inputted into step 304. In step 304, the computed component is determined from the received base data 306 and satellite orbit parameters 322. The process then passes to step 308, in which the common component is determined from the computed component outputted from step 304 and the inputted received base data 306.

The process then passes to step 310, in which the common component outputted from step 308 and the computed component outputted from step 304 are subtracted from the received base data 306 to generate the selected information component, which is modelled as an extrapolation function. In an embodiment of the invention, the extrapolation function is represented by a polynomial function, such as a linear polynomial. The coefficients of the polynomial function are determined and stored in memory.

The process then passes to step 312, in which the information component for the rover epoch 302 is predicted from the extrapolation function. The process then passes to step 314, in which the computed component is updated for the rover epoch 302. The process then passes to step 316, in which the common component outputted from step 308, the predicted information component outputted from step 312, and the updated computed component outputted from step 314 are summed to generate the extrapolated base data 320.

In an embodiment of the invention, step 310 is implemented with a second-order recursive digital filter comprising two accumulators. In another embodiment, step 310 is implemented with a second-order recursive analog filter comprising two time integrators.

Figure 4:
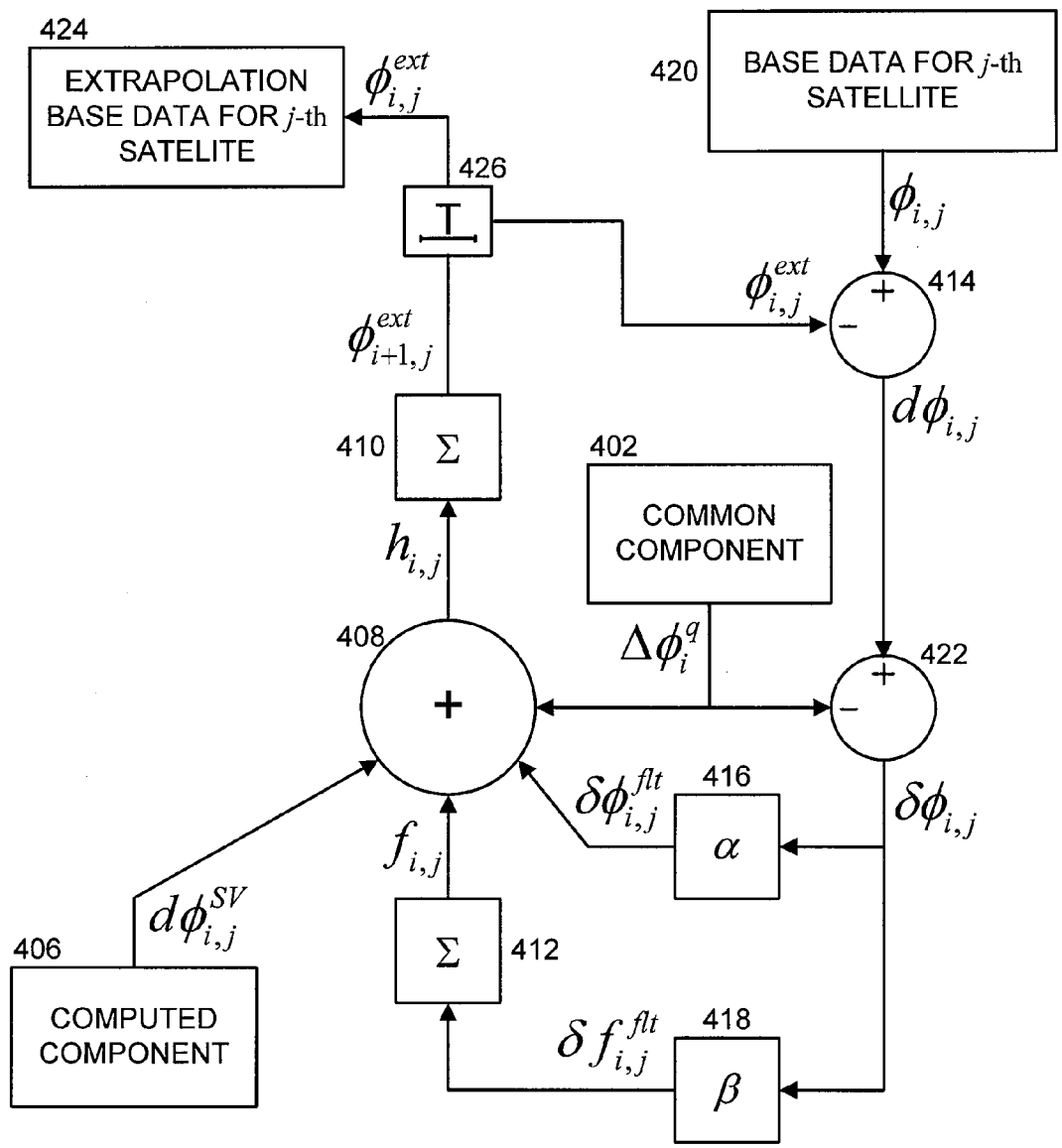
FIG. 4 shows a high-level schematic of a digital filter.

A block diagram of a digital filter according to an embodiment of the invention is shown in FIG. 4; in this example, $T_{ep}^{base} = T_{ep}^{rov}$. Operation of the digital filter for the case of processing full phases $\phi_{i,j}$, which come from base 130 via link 105 (see FIG. 1) and correspond to the i-th epoch is described, where i is the number of the epoch, and j is the number of the satellite. A similar digital filter may be used for processing pseudo-ranges. The full phase $\phi_{i,j}$ and full phase value $\phi_{i,j}^{ext}$ extrapolated to this epoch and calculated at the previous epoch of filter operation are inputted to operator 414. The difference between the input full phase $\phi_{i,j}$ and extrapolated full phase $\phi_{i,j}^{ext}$ is generated in operator 414. This difference is called the source difference (also referred to as the initial difference):

$$d\phi_{i,j} = \phi_{i,j} - \phi_{i,j}^{ext}. \tag{E1}$$

The source difference $d\phi_{i,j}$ includes the common component $\Delta\phi_i^q$, which is calculated in operator 402. The common component is subtracted from $d\phi_{i,j}$ in operator 422:

$$\delta\phi_{i,j} = d\phi_{i,j} - \Delta\phi_i^q.$$

The value $\delta\phi_{i,j}$ is the information component. It is transformed by proportional (operator 416) and integrating (operator 418 and operator 412) loops of the digital filter. The parameters $\alpha$ and $\beta$ determine the frequency characteristic of the digital filter and its dynamic performance. The symbol $\Sigma$ in operator 412 represents an accumulator. In operator 408, the computed component $d\phi_{i,j}^{SV}$, which is calculated in operator 406, is added to the outputs of the proportional loop ($\delta\phi_{i,j}^{fit}$) and integrating loop ($f_{i,j}$). The computed component $d\phi_{i,j}^{SV}$ an increment of the phase for the j-th satellite from the i-th to the (i+1)-th epoch, which was caused by satellite movement relative to the base. In addition, common component $\Delta\phi_i^q$, previously subtracted in operator 422, is added back in operator 408.

As a result, the output of operator 408 is the value $h_{i,j}$, which is an estimate of the phase increment for the j-th satellite over the time interval from the i-th to the (i+1)-th epochs:

$$h_{i,j} = \delta\phi_{i,j}^{flt} + f_{i,j} + d\phi_{i,j}^{SV} + \Delta\phi_i^q. \tag{E3}$$

In operator 410, the value $h_{i,j}$ is added to previously stored values of the accumulator. The symbol $\Sigma$ in operator 410 designates an accumulator. The operator 410 executes the following recursive transformation:

$$\phi_{i+1,j}^{ext} = \phi_{i,j}^{ext} + h_{i,j}. \tag{E4}$$

The operator 426 designates the delay in information for one epoch. It indicates that, at the current i-th epoch, data predicted for the (i+1)-th epoch is calculated. This data is stored in the calculator memory (is delayed for one epoch) and used at next current epoch. The output of the delay operator 426 is designated $\phi_{i,j}^{ext}$. The values $\phi_{i,j}^{ext}$ are the output data of the digital filter and can be used for solving the differential navigation task in delaying base data at the i-th rover epoch, provided that $T_{ep}^{base} = T_{ep}^{rov}$.

Figure 1:
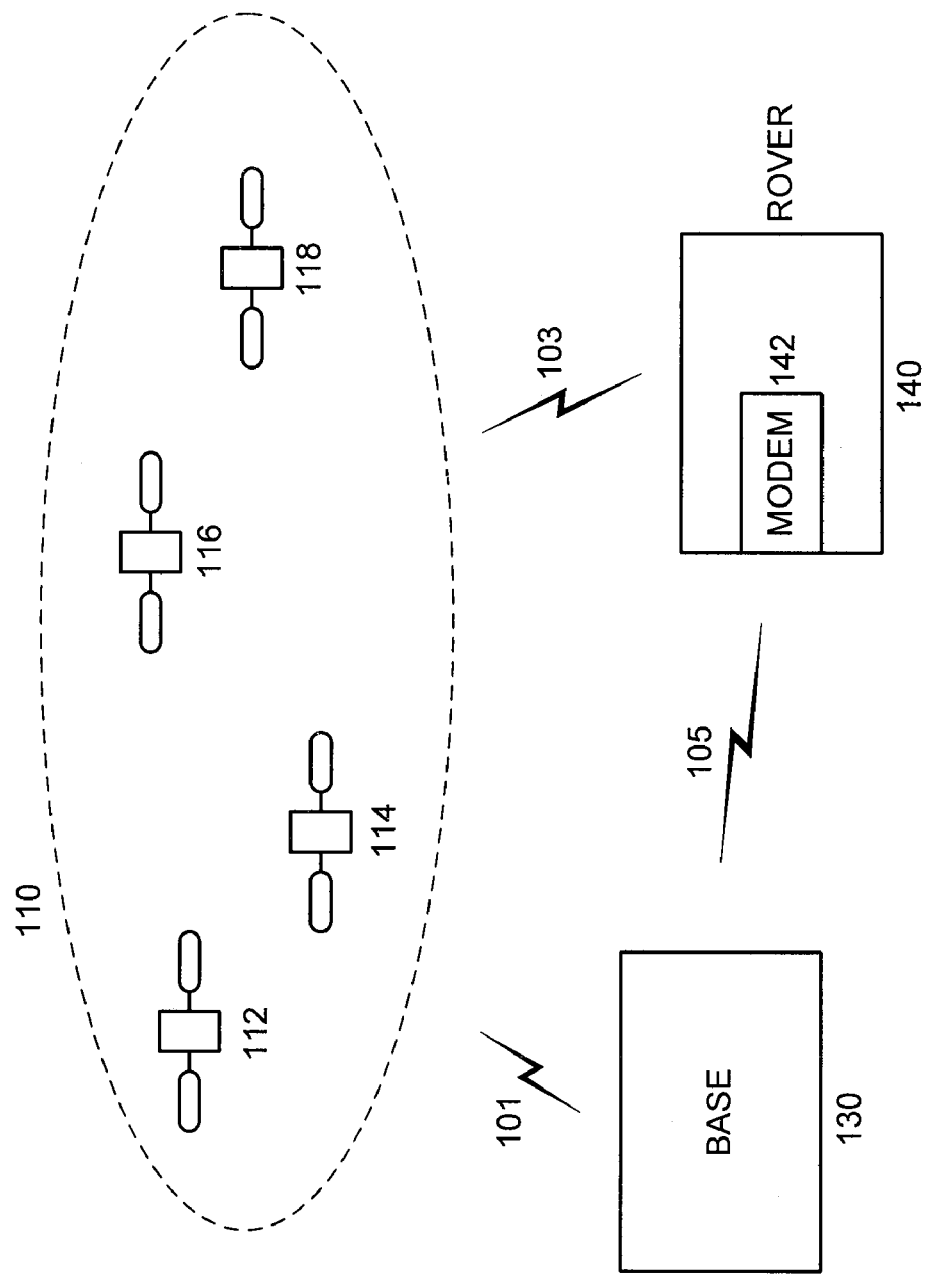
FIG. 1 shows a schematic of a differential navigation satellite system.
Figure 2:
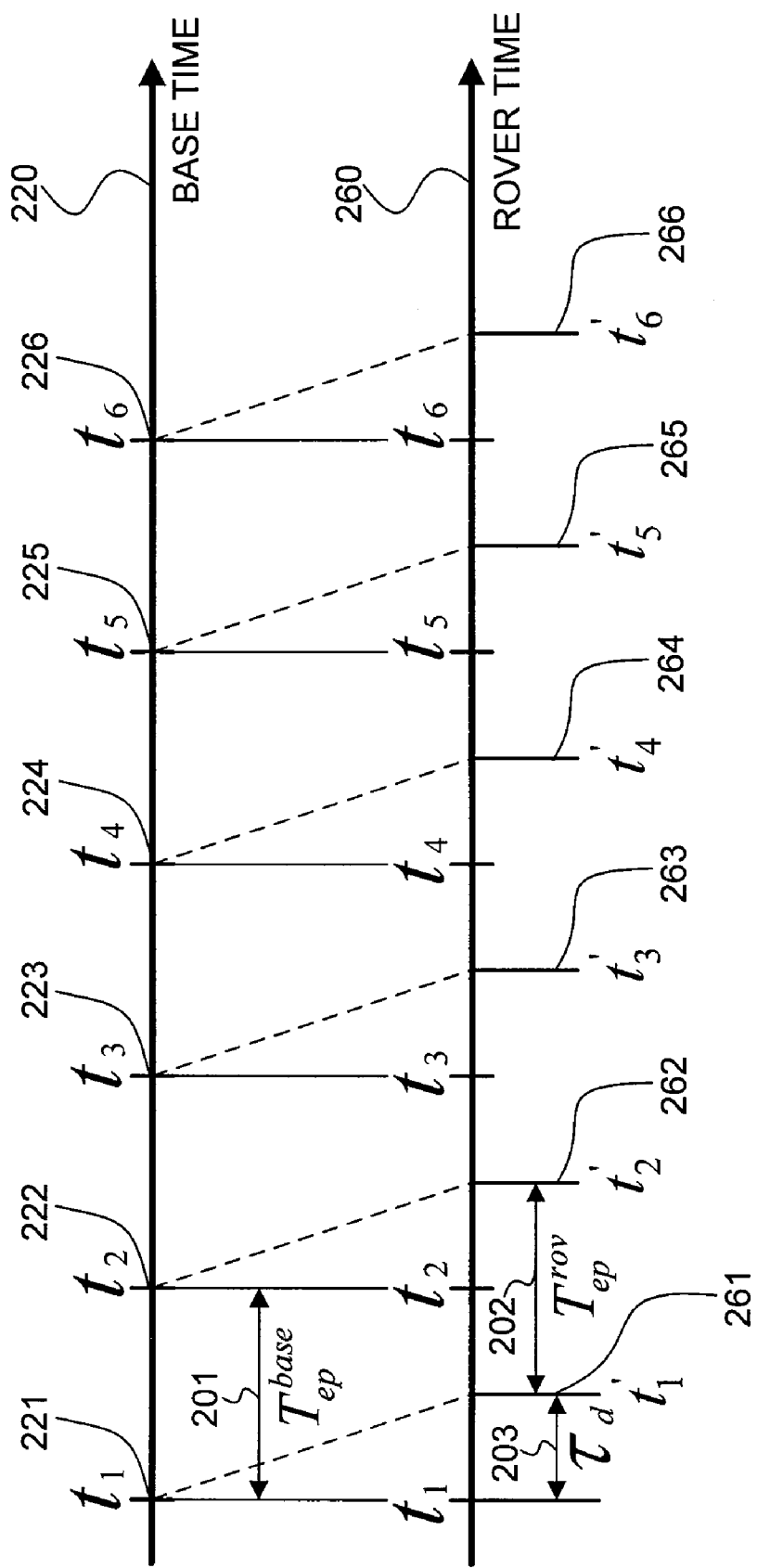
FIG. 2 shows the time correspondence between measurements taken at the base and measurements taken at the rover.
Figure 5A:
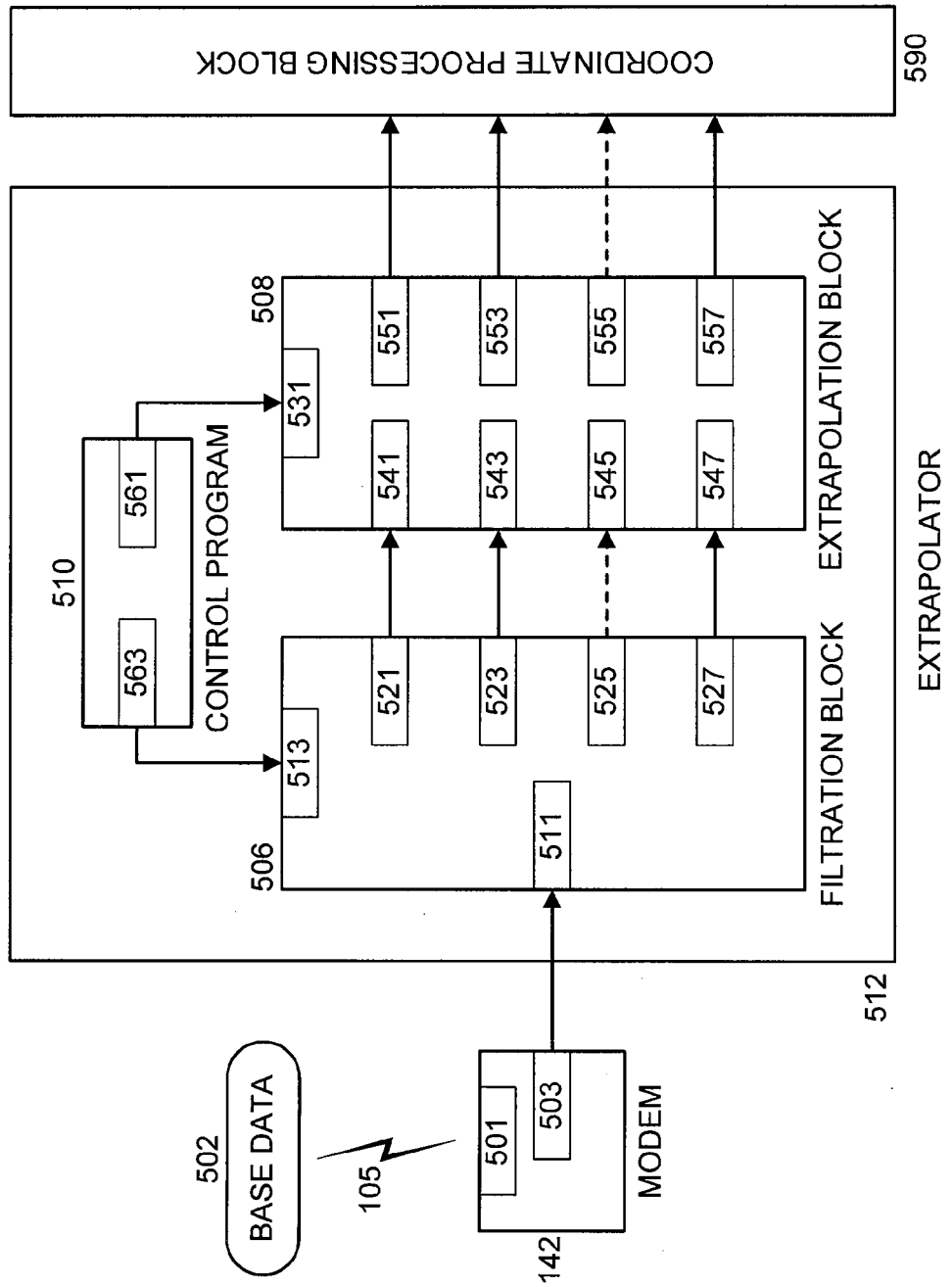
FIG. 5A-FIG. 5F show high-level schematics of an extrapolator.

A functional schematic diagram of an embodiment of an extrapolator is shown in FIG. 5A-FIG. 5F. In the discussion below, extrapolation of full phases is described in detail. Extrapolation of pseudo-ranges proceeds in a similar manner. Refer to FIG. 1 and FIG. 5A. Base 130 transmits base data 502 across wireless link 105 to rover 140. Base data 502 is received at input 501 of modem 142 at rover 140. Herein, inputs and outputs refer to functional inputs and outputs of functional blocks. The extrapolator 512 comprises two main functional blocks: filtration block 506 and extrapolation block 508. Base data 502 is transmitted from output 503 of modem 142 to input 511 of filtration block 506.

In an embodiment of the extrapolator 512, rover operation also with $T_{ep}^{base} \neq T_{ep}^{rov}$ is accounted for. That is, the duration of epochs ($T_{ep}^{base}$) in measurements coming via the wireless link 105 from the base 130 to the rover 140 can be different from the duration of epochs ($T_{ep}^{rov}$) in rover measurements. Rover measurements typically have a higher frequency than base measurements; for example, $T_{ep}^{base} = 1$ s and $T_{ep}^{rov} = 0.1$ s.

The filter shown in FIG. 4 is used as a component of the filtration block 506 of the extrapolator 512. The function of accumulator 410 is executed by the clock extrapolator 520 (see FIG. 5B).

The filtration block 506 operates according to the cycle of incoming information from the base (base epoch duration $T_{ep}^{base}$). Output values of the filtration block 506 are $\phi_{i,j}^{sum}$ and $f_{i,j}$. The values $\phi_{i,j}^{sum}$ are the sum total phase estimates. The values $f_{i,j}$ are the phase increments over one epoch $T_{ep}^{base}$. Since $T_{ep}^{base}$ is constant within any given system, the phase increment over the epoch $T_{ep}^{base}$ is referred to as a frequency of the information component and denoted as $f_{i,j}$.

The extrapolation block 506 switches on according to the rover clock and is designed for extrapolating base data in accordance with the corresponding rover epochs. The intervals at which the data is sampled is controlled by a control program (see below). Output values of the extrapolation block 508 are $\phi_{i,j}^{EXT}$ (base phase estimates extrapolated to rover epochs).

Filtration block 506 processes input 511. The processed outputs of filtration block 506, denoted output 521-output 527, are sent to input 541-input 547, respectively, of extrapolation block 508. Input 541-input 547 are processed by extrapolation block 508. Filtration block 506 and extrapolation block 508 operate under the control of control program 510. Output 563 from control program 510 is sent to input 513 of filtration block 506. Output 561 from control program 510 is sent to input 531 of extrapolation block 508. Further details of filtration block 506 and extrapolation block 508 are discussed below.

The outputs of extrapolation block 508, denoted output 551-output 557, are sent to inputs of coordinate processing block 590. Coordinate processing block 590 uses output 551-output 557 of extrapolation block 508, other data, and processing algorithms to determine the coordinates of rover 140. Further details of coordinate processing block 590 are not discussed.

Figure 5B:
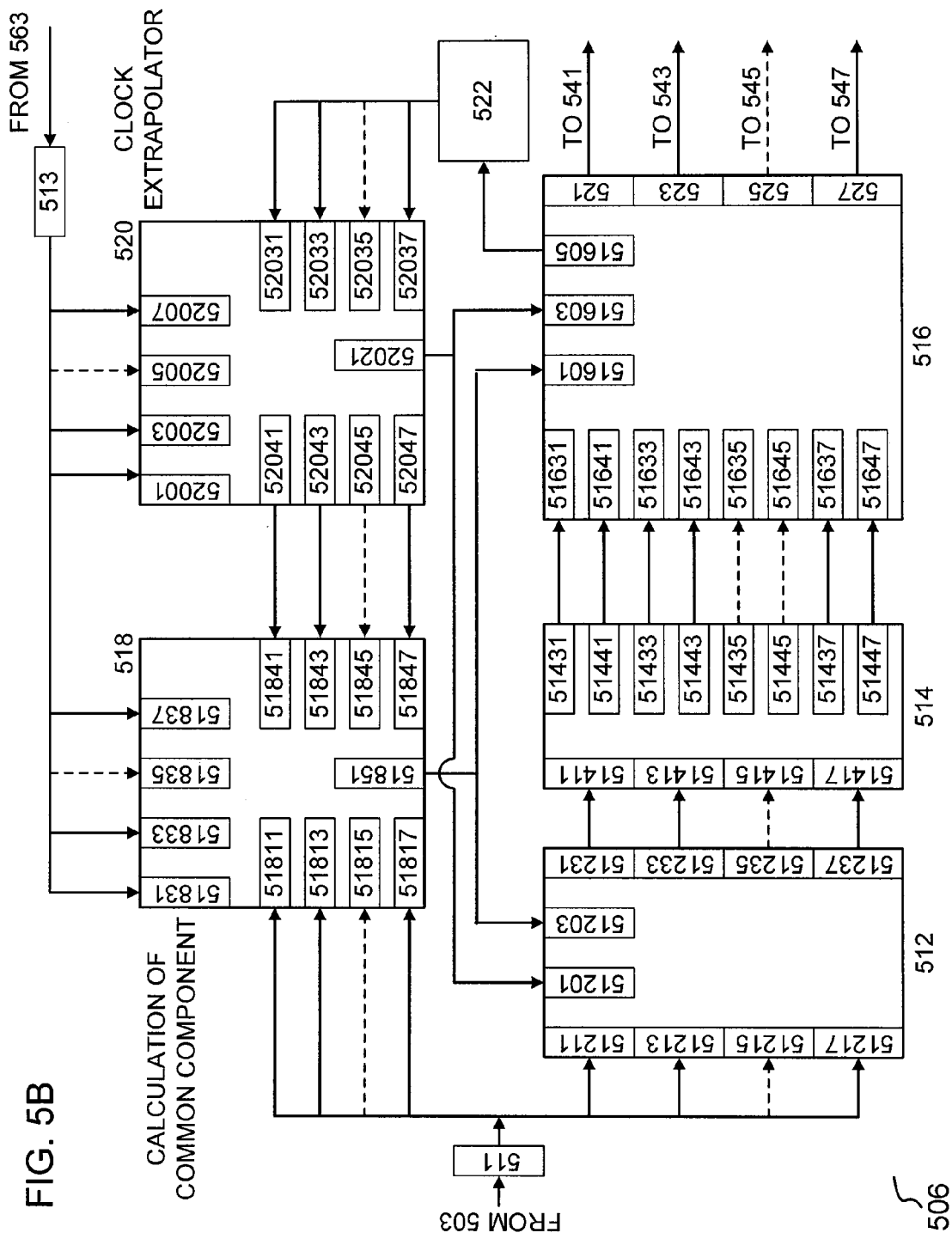
Figure 5C:
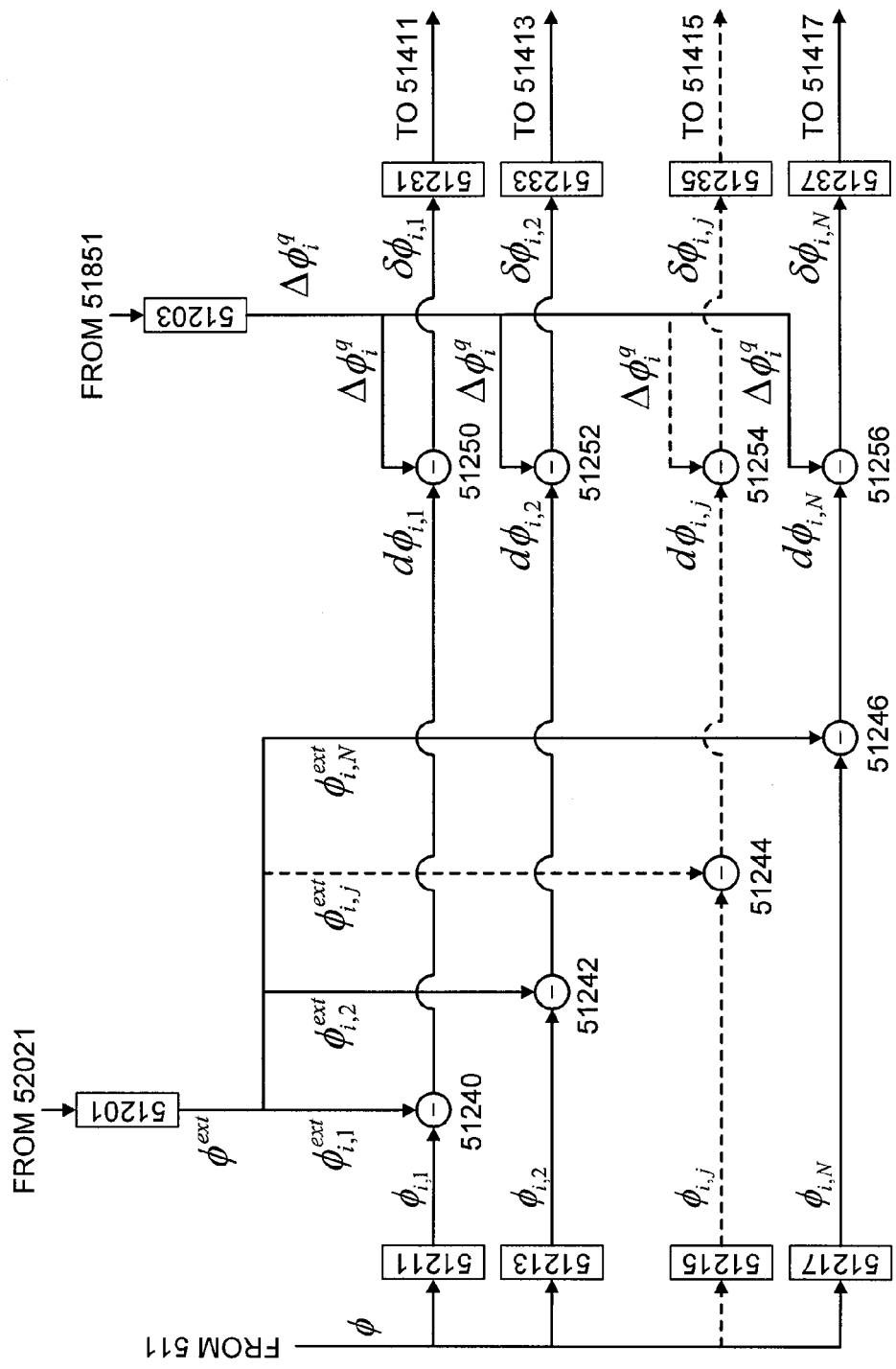
Figure 5D:
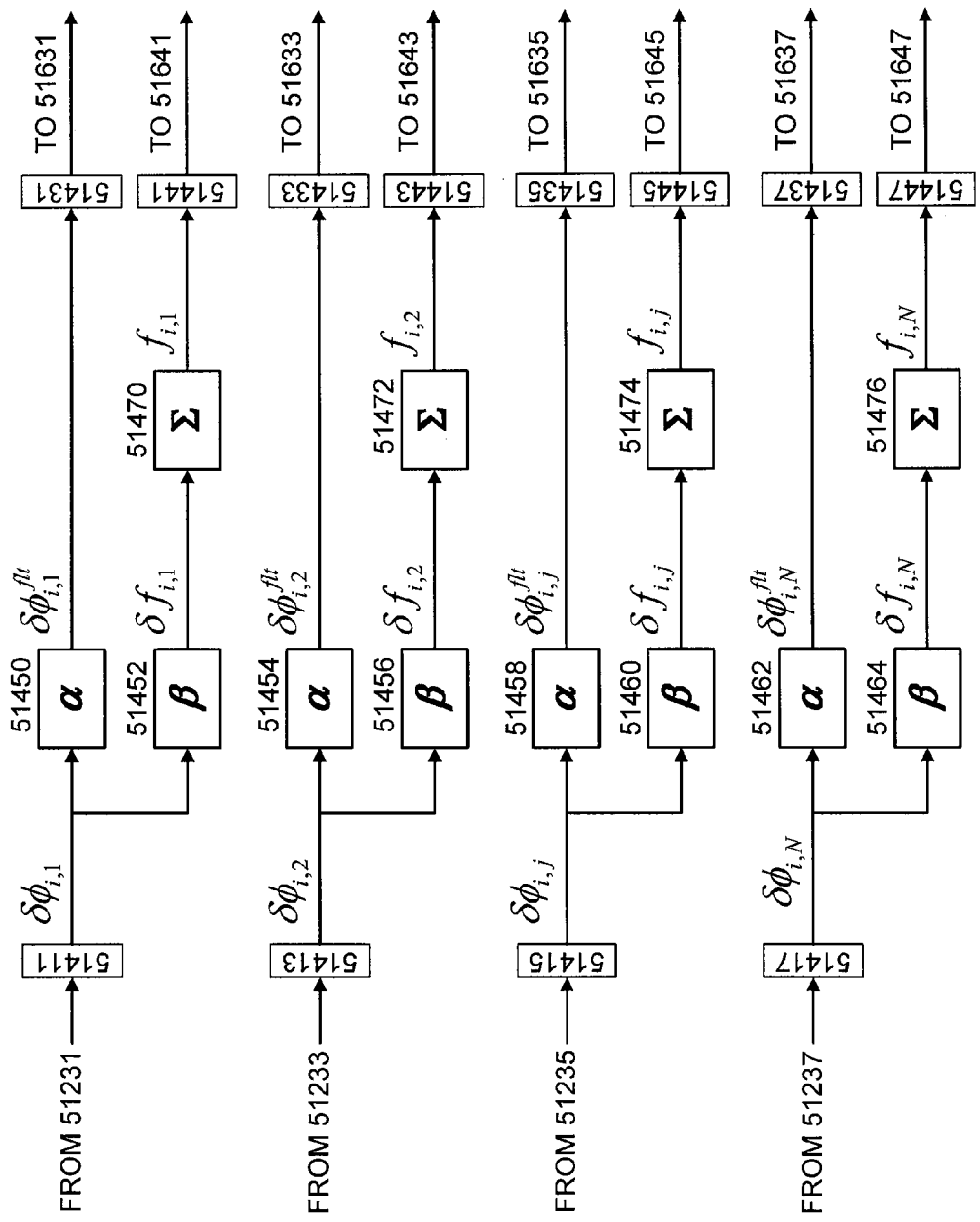
Figure 5E:
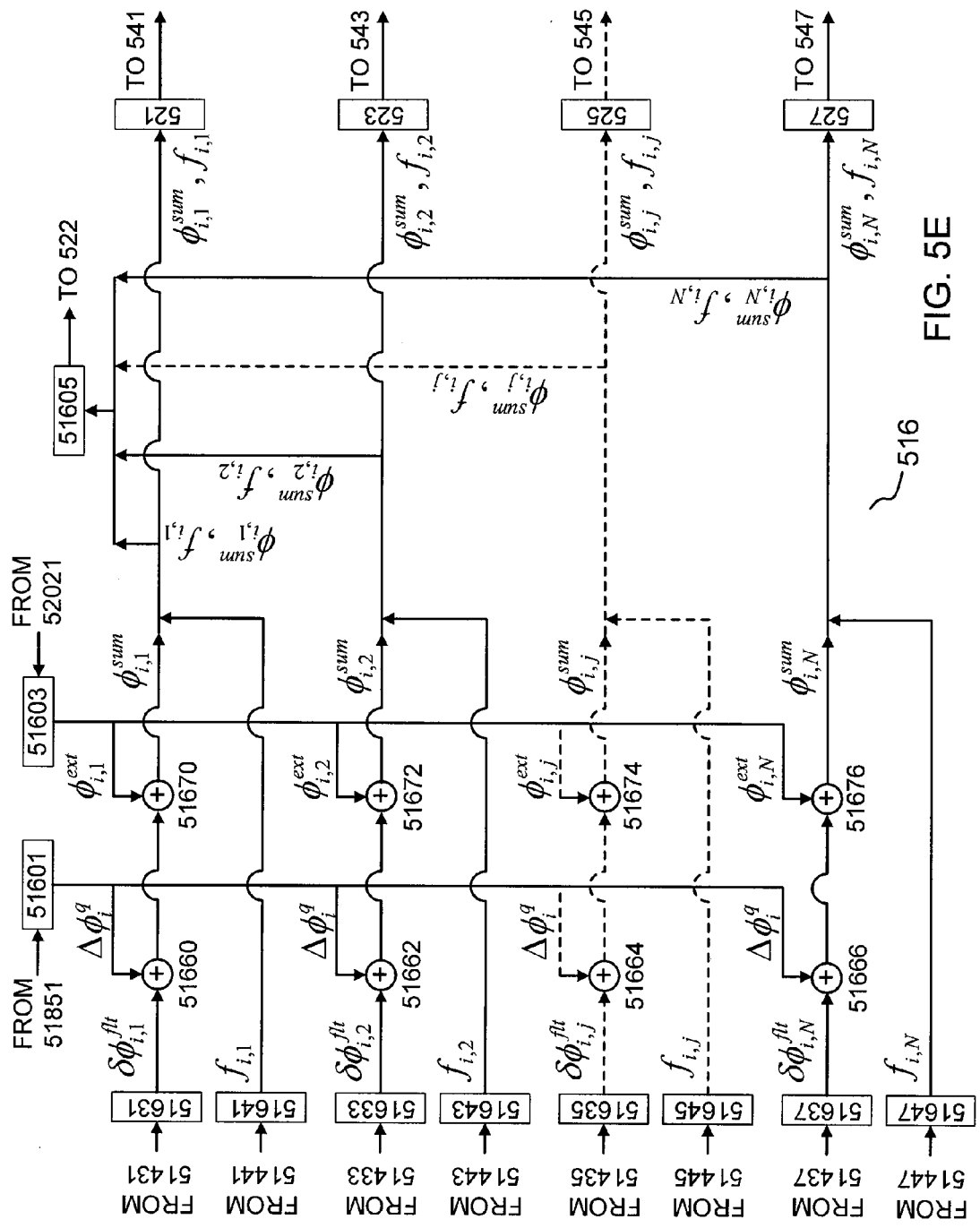

As shown in FIG. 5B, filtration block 506 comprises a set of functional modules, denoted module 512, module 514, module 516, module 518, and module 520. Details of module 512, module 514, and module 516 are shown in FIG. 5C, FIG. 5D, and FIG. 5E, respectively. Module 518 is referred to herein as the "calculation of common component" module. Module 520 is referred to herein as the "clock extrapolator" module.

The input 511 of filtration block 506 is received from output 503 of modem 142 (see FIG. 5A). The input 511 is sent in parallel to input 51211-input 51217 of module 512 and to input 51811-input 51817 of module 518. The input 511 represents the base data 502. In the example shown in FIG. 5A-FIG. 5F, input 511 represents values measured at the base 130 of the full phases $\phi_{i,j}$ (in cycles) of signals from N navigation satellites, where i is the epoch number and j is the number of the satellite. Input 51211-input 51217 represent $\phi_{i,1}, \phi_{i,2}, \phi_{i,j}, \ldots, \phi_{i,N}$, respectively. Similarly, input 51811-input 51817 represent $\phi_{i,1}, \phi_{i,2}, \ldots, \phi_{i,j}, \ldots, \phi_{i,N}$, respectively.

Input 511 includes other values of base data 502, such as pseudo-ranges. The pseudo-ranges are extrapolated in a similar manner to the carrier phases. As discussed above, the DGPS mode uses only pseudo-ranges; the RTK mode uses both pseudo-ranges and carrier phases.

The input 513 of filtration block 506 is received from output 563 of control program 510 (see FIG. 5A). The input 513 is sent in parallel to input 51831-input 51837 of module 518 and to input 52001-input 52007 of module 520. Input 513 represents range increments $\Delta R_{i,j}$. Input 51831-input 51837 represent $\Delta R_{i,1}, \Delta R_{i,2}, \ldots, \Delta R_{i,j}, \ldots, \Delta R_{i,N}$, respectively. Similarly, input 52001-input 52007 represent $\Delta R_{i,1}, \Delta R_{i,2}, \ldots, \Delta R_{i,j}, \ldots, \Delta R_{i,N}$, respectively. Range increments $\Delta R_{i,j}$ are calculated by the control program 510 as the difference of ranges from the base to the satellite j for the instants corresponding to the i-th and (i−1)-th epochs, referenced to the base clock. The range increments are calculated in step 304 ("determine computed component") in the flowchart shown in FIG. 3.

In some embodiments, the satellite elevation angles $\epsilon_{i,j}$ (referenced to the horizon) are also calculated. Functions of the elevation angles are used as weights in calculating the common component (see below).

Module 518 processes input 51811-51817, input 51831-51837, and input 51841-51847 to generate output 51851. This process is performed in step 308 ("determine common component") in the flowchart shown in FIG. 3. In an embodiment of the invention, the common component (output 51851) is calculated as follows.

First, the source phase differences $d\phi_{i,j}$ for each satellite j are calculated between the i-th and (i−1)-th epochs, referenced to the base clock. In one embodiment, they are calculated according to the expression:

$$d\phi_{i,j} = \phi_{i,j} - \phi_{i,j}^{ext}, \tag{E5}$$

where $\phi_{i,j}^{ext}$ is the value of the phase extrapolated to the current (i-th) epoch; and the full phase increment is assigned the value of source phase differences $$\Delta\phi_{i,j} = d\phi_{i,j}. \tag{E6}$$

It is calculated in the clock extrapolator 520. In another embodiment, the full phase increments $\Delta\phi_{i,j}$ are calculated according to the following expression:

$$\Delta\phi_{i,j} = \phi_{i,j} - \phi_{i-1,j} - d\phi_{i,j}^{SV}, \tag{E7}$$

where $d\phi_{i,j}^{SV}$ is the computed component, and it corresponds to the full phase increment due to the movement of the j-th satellite between the (i−1)-th and i-th base epochs, $$d\phi_{i,j}^{SV} = \frac{\Delta R_{i,j}}{\lambda_j}.$$

Here $\lambda_j$ is the carrier wavelength of the j-th satellite, and $\phi_{i,j} - \phi_{i-1,j}$ is the full phase difference for the j-th satellite between the (i−1)-th and i-th base epochs.

The common component $\Delta\phi_i^q$ is computed by weight averaging of the full phase increments $\Delta\phi_{i,j}$:

$$\Delta\phi_i^q = \sum_j P_{i,j} * \Delta\phi_{i,j}. \tag{E8}$$

The weight of each satellite $P_{i,j}$ in (E8) is determined as $$P_{i,j} = \frac{w_{i,j}}{\sum_j w_{i,j}}. \tag{E9}$$

where $w_{i,j}$ is the weight coefficient of the satellite. It is clear that $$\sum_j P_{i,j} = 1.$$

In one embodiment of the invention, the weight coefficients of satellites $w_{i,j}$ are determined as a function of satellite elevation angles $\epsilon_{i,j}$; for example, $w_{i,j} = \sin \epsilon_{i,j}$. In another embodiment, the weight coefficients of satellites are all set to an equal constant value (which may be equal to 1). Other user-specified functions may be used for weight coefficients.

Module 520 (clock extrapolator) processes input 52001-52007 and input 52031-52037 to generate output 52021 and output 52041-52047. In the clock extrapolator 520 (FIG. 5B), the phase at the current i-th epoch is predicted from the previous (i−1)-th epoch for each satellite j:

$$\phi_{i,j}^{ext} = \phi_{i-1,j}^{sum} + d\phi_{i,j}^{SV} + f_{i-1,j} * \frac{\Delta t_{i,j}^{ext}}{T_{ep}^{base}}, \tag{E10}$$

where:

$\phi_{i,j}^{ext}$ is the phase extrapolated to the current i-th epoch, $\phi_{i-1,j}^{sum}$ is the sum total phase estimate at the previous (i−1)-th epoch, and $\Delta t_{i,j}^{ext}$ is the time equal to the difference between the current i-th base epoch and the initialization time for the extrapolation function parameters. The initialization time corresponds to the base epoch for the most recent base data received at the rover. For example, if there is no missing base data, then $\Delta t_{i,j}^{ext} = T_{ep}^{base}$. If base data for the previous base epoch is missing (for example, due to interruptions in communications between the base and the rover), however, then $\Delta t_{i,j}^{ext} = 2T_{ep}^{base}$.

$$d\phi_{i,j}^{SV} = \frac{\Delta R_{i,j}}{\lambda_j}$$

is the computed component, and it corresponds to the full phase increment due to movement of the j-th satellite over time from the (i−1)-th base epoch to i-th base epoch, $\lambda_j$ is the carrier wavelength of the j-th satellite, $f_{i-1,j}$ is the frequency estimate at the (i−1)-th epoch, and j is the satellite number.

The information components $\delta\phi_{i,j}$ are calculated as a difference between source phase differences and the common component:

$$\delta\phi_{i,j} = d\phi^{i,j} - \Delta\phi_i^q, \tag{E11}$$

where $d\phi_{i,j}$ is the source phase differences calculated according to (E5). The information components are converted by multiplying the values in (E11) by the corresponding coefficients of the recursive filter:

$$\delta\phi_{i,j}^{flt} = \alpha * \delta\phi_{i,j}, \text{ and} \tag{E12}$$

$$\delta f_{i,j}^{flt} = \beta * \delta\phi_{i,j}, \tag{E13}$$

where $\alpha$ is the coefficient of the proportional filter loop, and $\beta$ is the coefficient of the integrating filter loop.

Herein $\alpha$ and $\beta$ are referred to as filter coefficients. As an example, if the epoch duration is equal to 1 s, appropriate coefficients are $\alpha=0.51$, and $\beta=0.09$. In one embodiment of the invention, variable coefficients $\alpha$ and $\beta$ are used at the initial interval of tracking the satellite. Variable coefficients reduce the interval of transient processes in the filter at the initial stage of tracking the satellite in view. Calculation of sum total estimates of full phases and frequency is performed according to the expressions:

$$\phi_{i,j}^{sum} = \phi_{i,j}^{ext} + \delta\phi_{i,j}^{flt} + \Delta\phi_i^q, \tag{E14}$$

and $$f_{i,j} = f_{i-1,j} + \delta f_{i,j}^{flt}. \tag{E15}$$

The output 51851 of module 518 is sent in parallel to input 51203 of module 512 and to input 51601 of module 516. The output 52021 of module 520 is sent in parallel to input 51201 of module 512 and input 51603 of module 516. Output 51231-output 51237 of module 512 are sent to input 51411-input 51417, respectively, of module 514. Output 51431-output 51445 of module 514 are sent to input 51631-input 51645, respectively, of module 516. Output 521-output 527 of module 516 are sent to input 541-input 547, respectively, of extrapolation block 508 (see FIG. 5A).

Refer to FIG. 5C for details of module 512. Input 51211-Input 51217 represent the values $\phi_{i,1}, \phi_{i,2}, \ldots \phi_{i,j}, \ldots \phi_{i,N}$, respectively, received from input 511. These values are inputted to subtraction operator 51240-subtraction operator 51246, respectively. Input 51201 represent the values $\phi^{ext}$ received from output 52021 of module 520 (clock extrapolator). The values $\phi_{i,1}^{ext}, \phi_{i,2}^{ext}, \ldots, \phi_{i,j}^{ext}, \ldots, \phi_{i,N}^{ext}$ are inputted to subtraction operator 51240-subtraction operator 51246, respectively. The outputs of subtraction operator 51240-subtraction operator 51246 [$d\phi_{i,1}, d\phi_{i,2}, \ldots, d\phi_{i,j}, \ldots, d\phi_{i,N}$, respectively] are inputted into subtraction operator 51250-subtraction operator 51256, respectively.

Input 51203 represent the values $\Delta\phi_i^q$ received from output 51851 of module 518 and are inputted into subtraction operator 51250-subtraction operator 51256, respectively. The outputs of subtraction operator 51250-subtraction operator 51256, designated output 51231-output 51237, respectively, represent the values $\delta\phi_{i,1}, \delta\phi_{i,2}, \ldots, \delta\phi_{i,j}, \ldots, \delta\phi_{i,N}$, respectively.

Refer to FIG. 5D for details of module 514. Input 51411-input 51417, representing the values $\delta\phi_{i,1}, \delta\phi_{i,2}, \ldots, \delta\phi_{i,j}, \ldots, \delta\phi_{i,N}$, respectively, are received from output 51231-output 51237 of module 512, respectively. The operators α51450, α51454, α51458, and α51462; β51452, β51456, β51460, and β51464; and Σ51470, Σ51472, Σ51474, and Σ51476 were discussed above with respect to the filter schematic of FIG. 4. The outputs of module 514 are output 51631, output 51633, output 51635, and output 51637, representing, $\delta\phi_{i,1}^{flt}, \delta\phi_{i,2}^{flt}, \ldots, \delta\phi_{i,j}^{flt}, \ldots \delta\phi_{i,N}^{flt}$, respectively, and output 51470, output 51472, output 51474, and output 51476, representing $f_{i,1}, f_{i,2}, f_{i,N}$, respectively.

Refer to FIG. 5E for details of module 516. Input 51631-input 51637, representing values $\delta\phi_{i,1}^{flt}, \delta\phi_{i,2}^{flt}, \ldots, \delta\phi_{i,j}^{flt}, \ldots, \delta\phi_{i,N}^{flt}$, respectively, are inputted into sum operator 51660-sum operator 51666, respectively. Input 51601 represents the values $\Delta\phi_i^q$ received from the output 51851 of module 518. The values $\Delta\phi_i^q$ are inputted into sum operator 51660-sum operator 51666, respectively. The outputs of sum operator 51660-sum operator 51666 are inputted into sum operator 51670-sum operator 51676, respectively. Input 51603 represents the values $\phi^{ext}$ received from output 52021 of module 520. The values $\phi_{i,1}^{ext}, \phi_{i,2}^{ext}, \ldots, \phi_{i,j}^{ext}, \ldots \phi_{i,N}^{ext}$ are inputted into sum operator 51670-sum operator 51676, respectively. The outputs of sum operator 51670-sum operator 51676 represent the values $\phi_{i,j}^{sum}, \phi_{i,j}^{sum}, \ldots, \phi_{i,j}^{sum}, \ldots, \phi_{i,j}^{sum}$, respectively.

Input 51641-input 51647 represent the values $f_{i,1}, f_{i,2}, \ldots, f_{i,j}, \ldots, f_{i,N}$, respectively, received from output 51441-output 51447 of module 514, respectively. The values $(\phi_{i,1}^{sum}, f_{i,1}), (\phi_{i,2}^{sum}, f_{i,2}), \ldots, (\phi_{i,j}^{sum}, f_{i,j}), \ldots, (\phi_{i,N}^{sum}, f_{i,N})$ are outputted to output 521-output 527, respectively. The values $(\phi_{i,1}^{sum}, f_{i,1}), (\phi_{i,2}^{sum}, f_{i,2}), \ldots, (\phi_{i,j}^{sum}, f_{i,j}), \ldots (\phi_{i,N}^{sum}, f_{i,N})$ are also outputted to output 51605.

As shown in FIG. 5B, the values $(\phi_{i,1}^{sum}, f_{i,1}), (\phi_{i,2}^{sum}, f_{i,2}), \ldots, (\phi_{i,j}^{sum}, f_{i,j}), \ldots, (\phi_{i,N}^{sum}, f_{i,N})$ from output 51605 are outputted to the input of module 522, which delays these values by one epoch $T_{ep}^{base}$. From the output of module 522, the values $(\phi_{i-1,1}^{sum}), (\phi_{i-1,2}^{sum}), \ldots, (\phi_{i-1,j}^{sum}), \ldots, (\phi_{i-1,N}^{sum})$ are inputted to input 52031-input 52037, respectively, of module 520.

Figure 5F:
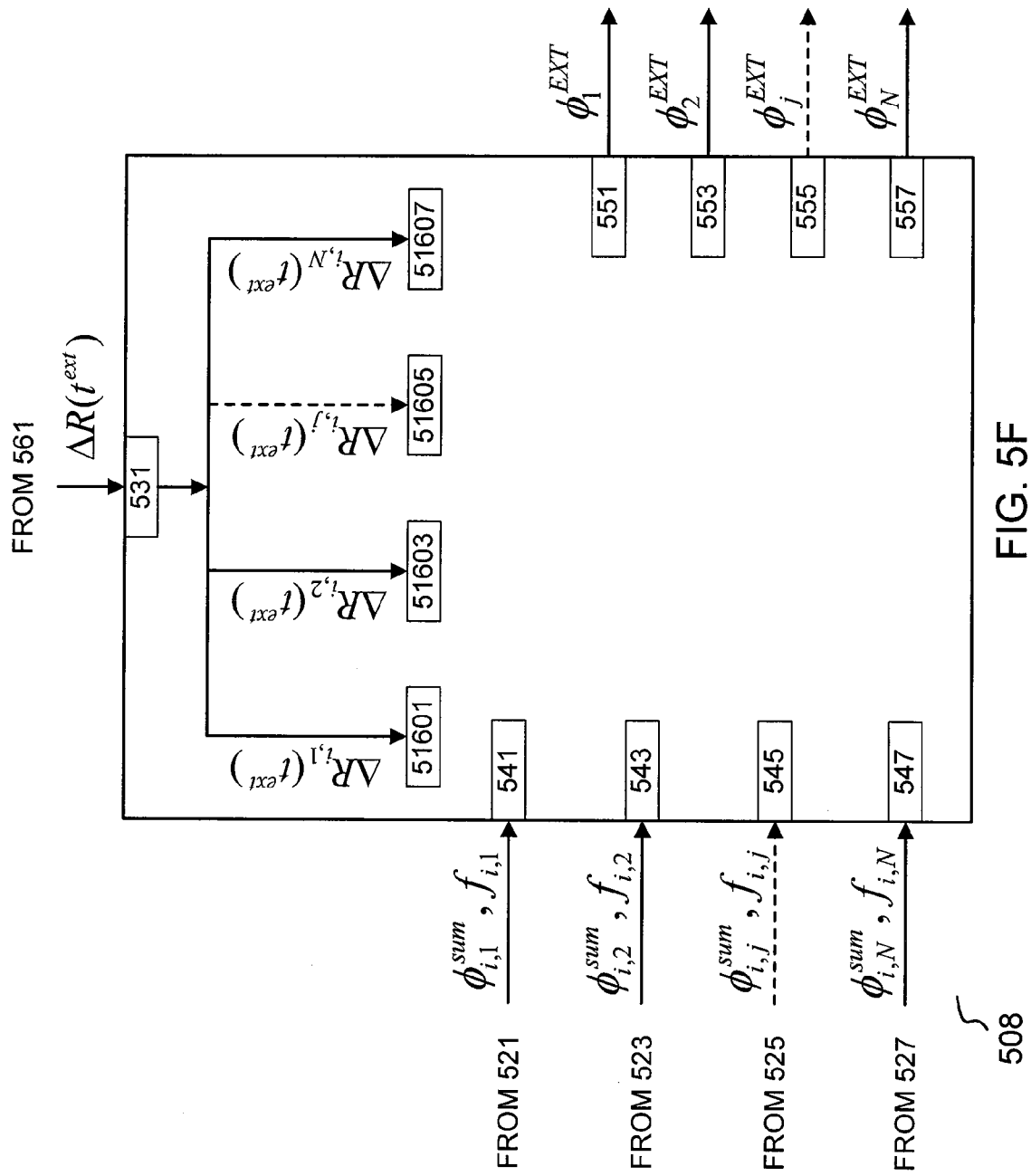

More details of the extrapolation block 508 (FIG. 5A) are shown in FIG. 5F. Input 541-input 547 represent the values $(\phi_{i,1}^{sum}, f_{i,1}), (\phi_{i,2}^{sum}, f_{i,2}), \ldots, (\phi_{i,j}^{sum}, f_{i,j}), \ldots, (\phi_{i,N}^{sum}, f_{i,N})$ received from output 521-output 527 of filtration block 506, respectively. The sum total estimates of full phases $\phi_{i,j}^{sum}$ and frequency $f_{i,j}$ are obtained at the i-th epoch (the i-th epoch corresponds to time instant $t_i$).

Input 531 represents the values $\Delta R(t^{ext})$ received from output 561 of control program 510. Input 51601-input 51607 represent the individual values, $\Delta R_{i,1}(t^{ext}), \Delta R_{i,2}(t^{ext}), \ldots, \Delta R_{i,j}(t^{ext}), \ldots, \Delta R_{i,N}(t^{ext})$, respectively. The range increments $\Delta R_{i,j}(t^{ext})$ are due to movement of the j-th satellite over the time elapsed from $t_j^{end}$ to $t^{ext}$, where $t^{ext}$ is the extrapolation instant (time at which the extrapolated value is determined), and $t_j^{end}$ is the corresponding base epoch for the parameters $\phi_{i,j}^{sum}$ and $f_{i,j}$ of the j-th satellite. The prediction interval (extrapolation interval) $\Delta t_j^{ext}$ is equal to the time interval between the extrapolation instant ($t^{ext}$) and the $i_j^{end}$-th epoch ($t_j^{end}$); that is, $\Delta t_j^{ext} = t^{ext} - t_j^{end}$. The value $t^{ext}$ is equal to the current rover epoch for which extrapolated base data values need to be obtained. A rover epoch is referenced to the clock in the rover receiver, and a rover epoch is a common reference time for data received from all navigation satellites. Herein, the value $t^{ext}$ is also referred to as the rover measurement time. If the rover is not receiving data from a specific satellite, there is no need to extrapolate base data for that specific satellite. For a specific base epoch, base data may be available for some satellites, but missing for others. For example, in some instances, base data transmitted from the base to the rover may be partially corrupted. In other instances, the satellite links between the base and specific satellites may be disrupted, and base data for those specific satellites were never collected. Therefore, $t_j^{end}$ and $\Delta t_j^{ext}$ can be different for different satellites.

Output 551-557 represent the values $\phi_1^{EXT}, \phi_2^{EXT}, \ldots, \phi_j^{EXT}, \ldots, \phi_N^{EXT}$, respectively. The extrapolated phases are calculated according to the expression:

$$\phi_j^{EXT} = \phi_{i,j}^{sum} + f_{i,j} * \frac{\Delta t_j^{ext}}{T_{ep}^{base}} + d\phi_{i,j}^{SV}, \quad (E16)$$

where
$T_{ep}^{base}$ is the duration of the base epoch, and $$d\phi_{i,j}^{SV} = \frac{\Delta R_{i,j}(t^{ext})}{\lambda_j}$$

is the computed component, and it corresponds to the phase increment due to movement of the j-th satellite over the time interval $\Delta t_j^{ext}$.

In (E16), the extrapolation function is a linear (first-order) polynomial function:

$$\phi_j^{EXT} = A * \Delta t_j^{ext} + B + d\phi_{i,j}^{SV}, \quad (E17)$$

with term coefficients $A = f_{i,j} * \frac{1}{T_{ep}^{base}}$ and $B = \phi_{i,j}^{sum}$.

In another embodiment, the extrapolation function is a quadratic (second-order) polynomial:

$$\phi_j^{EXT} = \phi_{i,j}^{SV} + f_{i,j} * \frac{\Delta t_j^{ext}}{T_{ep}^{base}} + f'_{i,j} * \left(\frac{\Delta t_j^{ext}}{T_{ep}^{base}}\right)^2 + d\phi_{i,j}^{SV}, \quad (E18)$$

where $f_{i,j}'$ is the output of the integrating loop which determines astatism of the third order for the digital filter. The expression (E18) may be re-written in general quadratic form:

$$\phi_j^{EXT} = A*(\Delta t_j^{ext})^2 + B*\Delta t_j^{ext} + C + d\phi_{i,j}^{SV}, \quad (E18)$$

with term coefficients $A = f'_{i,j} * \left(\dfrac{1}{T_{ep}^{base}}\right)^2$, $B = f_{i,j} * \dfrac{1}{T_{ep}^{base}}$, and $C = \phi_{i,j}^{sum}$.

Figure 6:
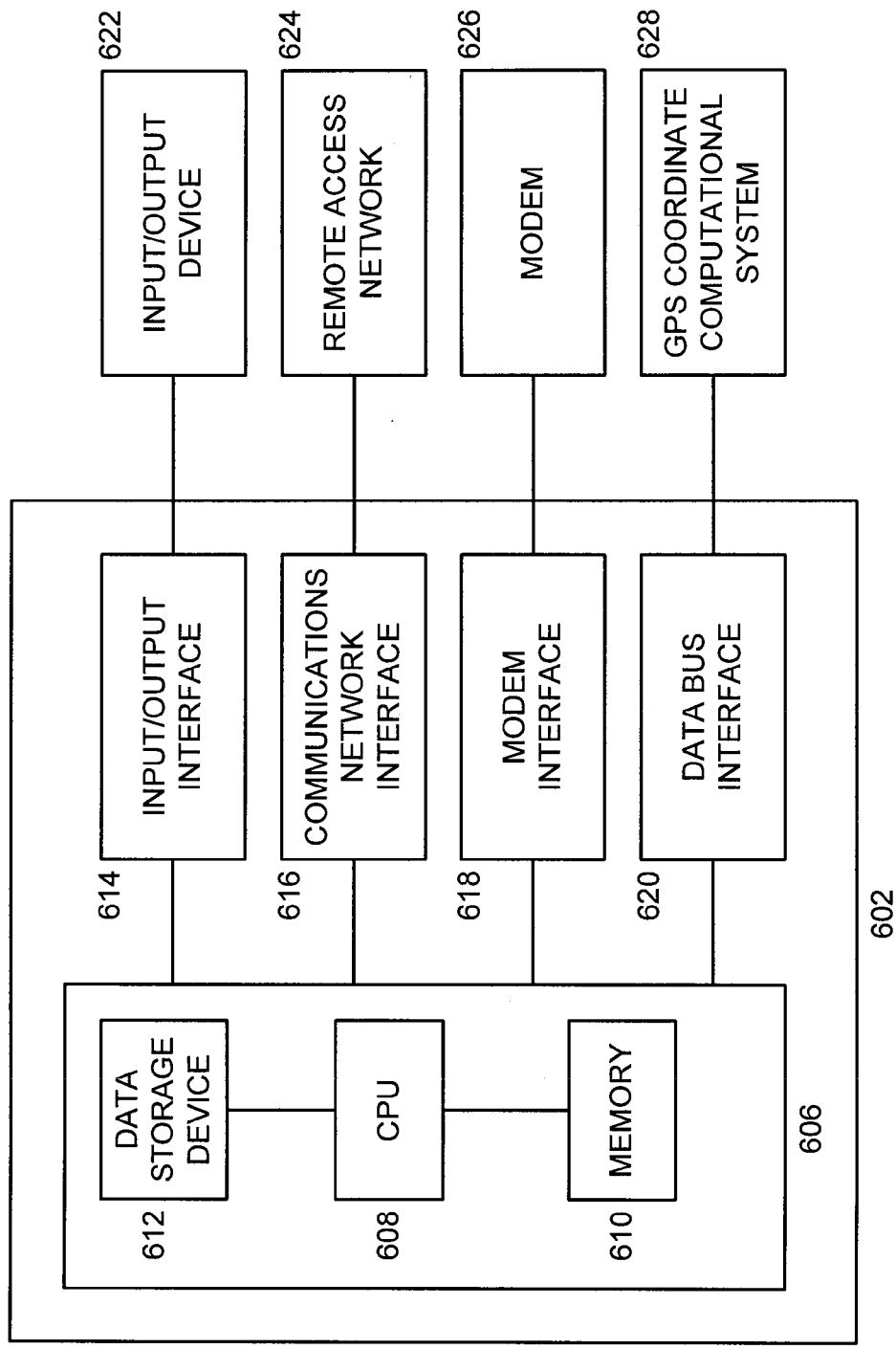
FIG. 6 shows a high-level schematic of a computational system for implementing an extrapolator.

An embodiment of a computational system for implementing the extrapolator 512 (FIG. 5A) is shown in FIG. 6. The computational system 602 is typically located in the navigation receiver of rover 140 (FIG. 1); however, it may be a separate unit. One skilled in the art may construct the computational system 602 from various combinations of hardware, firmware, and software. One skilled in the art may construct the computational system 602 from various electronic components, including one or more general purpose microprocessors, one or more digital signal processors, one or more application-specific integrated circuits (ASICs), and one or more field-programmable gate arrays (FPGAs).

Computational system 602 comprises computer 606, which includes a central processing unit (CPU) 608, memory 610, and data storage device 612. Data storage device 612 comprises at least one persistent, tangible computer readable medium, such as non-volatile semiconductor memory, a magnetic hard drive, or a compact disc read only memory. In an embodiment of the invention, computer 606 is implemented as an integrated device.

Computational system 602 may further comprise user input/output interface 614, which interfaces computer 606 to user input/output device 622. Examples of input/output device 622 include a keyboard, a mouse, and a local access terminal. Data, including computer executable code, may be transferred to and from computer 606 via input/output interface 614.

Computational system 602 may further comprise communications network interface 616, which interfaces computer 606 with remote access network 624. Examples of remote access network 624 include a local area network and a wide area network. A user may access computer 606 via a remote access terminal (not shown). Data, including computer executable code, may be transferred to and from computer 606 via communications network interface 616.

Computational system 602 may further comprise a modem interface 618, which interfaces computer 606 with modem 626. An example of modem 626 is modem 142 in FIG. 1, which receives input base data. In general, a modem refers to a communications device which receives input data from the base or other data source.

Computational system 602 may further comprise data bus interface 620, which interfaces computer 606 with GPS coordinate computational system 628, which, for example, performs the function of coordinate processing block 590 in FIG. 5A. Extrapolated data computed by computer 602 is transmitted to GPS coordinate computational system 628 via data bus interface 620. GPS coordinate computational system 628 calculates the coordinates of the rover, such as rover 140 in FIG. 1.

As is well known, a computer operates under control of computer software, which defines the overall operation of the computer and applications. CPU 608 controls the overall operation of the computer and applications by executing computer program instructions which define the overall operation and applications. The computer program instructions may be stored in data storage device 612 and loaded into memory 610 when execution of the program instructions is desired. The method steps shown in the flowchart in FIG. 3, and the processes shown in the schematics of FIG. 4 and FIG. 5A-FIG. 5F, may be defined by computer program instructions stored in the memory 610 or in the data storage device 612 (or in a combination of memory 610 and data storage device 612) and controlled by the CPU 608 executing the computer program instructions. For example, the computer program instructions may be implemented as computer executable code programmed by one skilled in the art to perform algorithms implementing the method steps shown in the flowchart in FIG. 3 and the processes shown in the schematics of FIG. 4 and FIG. 5A-FIG. 5F. Accordingly, by executing the computer program instructions, the CPU 608 executes algorithms implementing the method steps shown in the flowchart in FIG. 3 and the processes shown in the schematics of FIG. 4 and FIG. 5A-FIG. 5F.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for calculating coordinates of a rover receiver, the method comprising the steps of:
   receiving, at the rover receiver, base data corresponding to a base, wherein the base data comprises:
      a plurality of base parameters, each specific base parameter in the plurality of base parameters corresponding to a specific navigation satellite selected from a plurality of navigation satellites and corresponding to a specific base epoch selected from a plurality of base epochs;
   receiving a plurality of satellite orbit parameters at the rover receiver, each specific satellite orbit parameter in the plurality of satellite orbit parameters corresponding to a specific navigation satellite selected from the plurality of navigation satellites;
   calculating for each specific navigation satellite and for each specific base epoch a specific computed component;
   calculating for each specific base epoch a specific common component;
   calculating for each specific navigation satellite and for each specific base epoch a specific information component;
   calculating for each specific information component and for each specific base epoch a specific extrapolation function;
   calculating for each specific information component a specific extrapolated information component extrapolated to a rover epoch referenced to a clock in the rover receiver, wherein the specific extrapolated information component is calculated from:
      at least one base parameter received at the rover receiver prior to the rover epoch; and
      the specific extrapolation function;

calculating for each specific navigation satellite a specific updated computed component at the rover epoch;

calculating for each specific navigation satellite the sum of the extrapolated specific information component at the rover epoch, the updated computed component at the rover epoch, and the common component; and calculating the coordinates of the rover receiver based at least in part on the sum, calculated for each specific navigation satellite, of the extrapolated specific information component at the rover epoch, the updated computed component at the rover epoch, and the common component.

2. The method of claim 1, wherein:
the base parameters comprise base pseudo-ranges.

3. The method of claim 2, wherein the step of calculating for each specific navigation satellite and for each specific base epoch a specific computed component comprises the steps of:
calculating a specific first base range between the base and the specific navigation satellite corresponding to the specific base epoch;
calculating a specific second base range between the base and the specific navigation satellite corresponding to the base epoch prior to the specific base epoch; and
subtracting the specific second base range from the specific first base range.

4. The method of claim 2, wherein the step of calculating for each specific base epoch a specific common component comprises the steps of:
calculating a plurality of source pseudo-range differences, each specific source pseudo-range difference corresponding to a specific navigation satellite; and
weight averaging over all navigation satellites the plurality of source pseudo-range differences.

5. The method of claim 4, wherein the step of weight averaging over all navigation satellites the plurality of source pseudo-range differences comprises the step of multiplying each source pseudo-range difference by one of:
a specific constant weight coefficient; and
a specific weight coefficient comprising the sine of an elevation angle of the specific navigation satellite.

6. The method of claim 2, wherein the step of calculating for each specific base epoch a specific common component comprises the steps of:
calculating a plurality of pseudo-range differences, each specific pseudo-range difference corresponding to a specific navigation satellite;
calculating a plurality of pseudo-range increments by subtracting the specific computed component from each specific pseudo-range difference; and
weight averaging over all navigation satellites the plurality of pseudo-range increments.

7. The method of claim 6, wherein the step of weight averaging over all navigation satellites the plurality of pseudo-range increments comprises the step of multiplying each pseudo-range increment by one of:
a specific constant weight coefficient; and
a specific weight coefficient comprising the sine of an elevation angle of the specific navigation satellite.

8. The method of claim 2, wherein the step of calculating for each specific information component a specific extrapolation function comprises the step of calculating one of:
a specific first-order polynomial function; and
a specific second-order polynomial function.

9. The method of claim 1, wherein:
the base parameters comprise base full phases.

10. The method of claim 9, wherein the step of calculating for each specific navigation satellite and for each specific base epoch a specific computed component comprises the steps of:
calculating a specific first base range between the base and the specific navigation satellite corresponding to the specific base epoch;
calculating a specific second base range between the base and the specific navigation satellite corresponding to the base epoch prior to the specific base epoch;
calculating a specific base range increment by subtracting the specific second base range from the specific first base range; and
dividing the specific base range increment by a specific carrier wavelength.

11. The method of claim 9, wherein the step of calculating for each specific base epoch a specific common component comprises the steps of:
calculating a plurality of source phase differences, each specific source phase difference corresponding to a specific navigation satellite; and
weight averaging over all navigation satellites the plurality of source phase differences.

12. The method of claim 11, wherein the step of weight averaging over all navigation satellites the plurality of source phase differences comprises the step of multiplying each specific source phase difference by one of:
a specific constant weight coefficient; and
a specific weight coefficient comprising the sine of an elevation angle of the specific navigation satellite.

13. The method of claim 9, wherein the step of calculating for each specific base epoch a specific common component comprises the steps of:
calculating a plurality of full phase differences, each specific full phase difference corresponding to a specific navigation satellite;
calculating a plurality of full phase increments by subtracting the specific computed component from each specific full phase difference; and
weight averaging over all navigation satellites the plurality of full phase increments.

14. The method of claim 13, wherein the step of weight averaging over all navigation satellites the plurality of full phase increments comprises the step of multiplying each full phase increment by one of:
a specific constant weight coefficient; and
a specific weight coefficient comprising the sine of an elevation angle of the specific navigation satellite.

15. The method of claim 9, wherein the step of calculating for each specific information component a specific extrapolation function comprises the step of calculating one of:
a specific first-order polynomial function; and
a specific second-order polynomial function.

16. The method of claim 1, wherein the step of calculating for each specific information component a specific extrapolation function comprises the step of calculating one of:
the specific extrapolation function with a specific second-order digital recursive filter; and
the specific extrapolation function with a specific third-order digital recursive filter.

17. The method of claim 16, wherein:
the specific second-order digital recursive filter comprises:
a specific constant proportional loop coefficient; and
a specific constant integrating loop coefficient stored in an accumulator; and
the specific extrapolation function comprises a specific first-order polynomial comprising:
a specific first term coefficient comprising the sum of:

a product of the specific information component multiplied by the specific constant proportional loop coefficient,
the specific extrapolated information component, and
the specific common component; and
a specific second term coefficient comprising a product of the specific information component multiplied by the specific constant integrating loop coefficient.

18. The method of claim 16, wherein:
the specific second-order digital recursive filter comprises:
a specific variable proportional loop coefficient dependent on a time elapsed from a specific starting time for tracking of a specific satellite; and
a specific variable integrating loop coefficient dependent on the time elapsed from the specific starting time for tracking of the specific satellite, wherein the specific variable integrating loop coefficient is stored in an accumulator; and
the specific extrapolation function comprises a specific first-order polynomial comprising:
a specific first term coefficient comprising the sum of:
a product of the specific information component multiplied by the specific variable proportional loop coefficient,
the specific extrapolated information component, and
the specific common component; and
a specific second term coefficient comprising a product of the specific information component multiplied by the specific variable integrating loop coefficient.

19. An apparatus for extrapolating base data corresponding to a base, the apparatus comprising:
means for receiving the base data at a rover receiver, the base data comprising:
a plurality of base parameters, each specific base parameter in the plurality of base parameters corresponding to a specific navigation satellite selected from a plurality of navigation satellites and corresponding to a specific base epoch selected from a plurality of base epochs;
means for receiving a plurality of satellite orbit parameters at the rover receiver, each specific satellite orbit parameter in the plurality of satellite orbit parameters corresponding to a specific navigation satellite selected from the plurality of navigation satellites;
means for calculating for each specific navigation satellite and for each specific base epoch a specific computed component;
means for calculating for each specific base epoch a specific common component;
means for calculating for each specific navigation satellite and for each specific base epoch a specific information component;
means for calculating for each specific information component and for each specific base epoch a specific extrapolation function;
means for calculating for each specific information component a specific extrapolated information component extrapolated to a rover epoch referenced to a clock in the rover receiver, wherein the specific extrapolated information component is calculated from:
at least one base parameter received at the rover receiver prior to the rover epoch; and
the specific extrapolation function;
means for calculating for each specific navigation satellite a specific updated computed component at the rover epoch; and
means for calculating for each specific navigation satellite the sum of the extrapolated specific information component at the rover epoch, the updated computed component at the rover epoch, and the common component.

20. The apparatus of claim 19, wherein:
the base parameters comprise base pseudo-ranges.

21. The apparatus of claim 20, wherein the means for calculating for each specific navigation satellite and for each specific base epoch a specific computed component comprises:
means for calculating a specific first base range between the base and the specific navigation satellite corresponding to the specific base epoch;
means for calculating a specific second base range between the base and the specific navigation satellite corresponding to the base epoch prior to the specific base epoch; and
means for subtracting the specific second base range from the specific first base range.

22. The apparatus of claim 20, wherein the means for calculating for each specific base epoch a specific common component comprises:
means for calculating a plurality of source pseudo-range differences, each specific source pseudo-range difference corresponding to a specific navigation satellite; and
means for weight averaging over all navigation satellites the plurality of source pseudo-range differences.

23. The apparatus of claim 22, wherein the means for weight averaging over all navigation satellites the plurality of source pseudo-range differences comprises means for multiplying each source pseudo-range difference by one of:
a specific constant weight coefficient; and
a specific weight coefficient comprising the sine of an elevation angle of the specific navigation satellite.

24. The apparatus of claim 20, wherein the means for calculating for each specific base epoch a specific common component comprises:
means for calculating a plurality of pseudo-range differences, each specific pseudo-range difference corresponding to a specific navigation satellite;
means for calculating a plurality of pseudo-range increments by subtracting the specific computed component from each specific pseudo-range difference; and
means for weight averaging over all navigation satellites the plurality of pseudo-range increments.

25. The apparatus of claim 24, wherein the means for weight averaging over all navigation satellites the plurality of pseudo-range increments comprises means for multiplying each pseudo-range increment by one of:
a specific constant weight coefficient; and
a specific weight coefficient comprising the sine of an elevation angle of the specific navigation satellite.

26. The apparatus of claim 20, wherein the means for calculating for each specific information component a specific extrapolation function comprises means for calculating one of:
a specific first-order polynomial function; and
a specific second-order polynomial function.

27. The apparatus of claim 19, wherein:
the base parameters comprise base full phases.

28. The apparatus of claim 27, wherein the means for calculating for each specific navigation satellite and for each specific base epoch a specific computed component comprises:
means for calculating a specific first base range between the base and the specific navigation satellite corresponding to the specific base epoch;

means for calculating a specific second base range between the base and the specific navigation satellite corresponding to the base epoch prior to the specific base epoch;
means for calculating a specific base range increment by subtracting the specific second base range from the specific first base range; and
means for dividing the specific base range increment by a specific carrier wavelength.

29. The apparatus of claim 27, wherein the means for calculating for each specific base epoch a specific common component comprises:
means for calculating a plurality of source phase differences, each specific source phase difference corresponding to a specific navigation satellite; and
means for weight averaging over all navigation satellites the plurality of source phase differences.

30. The apparatus of claim 29, wherein the means for weight averaging over all navigation satellites the plurality of source phase differences comprises means for multiplying each specific source phase difference by one of:
a specific constant weight coefficient; and
a specific weight coefficient comprising the sine of an elevation angle of the specific navigation satellite.

31. The apparatus of claim 27, wherein the means for calculating for each specific base epoch a specific common component comprises:
means for calculating a plurality of full phase differences, each specific full phase difference corresponding to a specific navigation satellite;
means for calculating a plurality of full phase increments by subtracting the specific computed component from each specific full phase difference; and
means for weight averaging over all navigation satellites the plurality of full phase increments.

32. The apparatus of claim 31, wherein the means for weight averaging over all navigation satellites the plurality of full phase increments comprises means for multiplying each full phase increment by one of:
a specific constant weight coefficient; and
a specific weight coefficient comprising the sine of an elevation angle of the specific navigation satellite.

33. The apparatus of claim 27, wherein the means for calculating for each specific information component a specific extrapolation function comprises means for calculating one of:
a specific first-order polynomial function; and
a specific second-order polynomial function.

34. The apparatus of claim 19, wherein the means for calculating for each specific information component a specific extrapolation function comprises means for calculating one of:
the specific extrapolation function with a specific second-order digital recursive filter; and
the specific extrapolation function with a specific third-order digital recursive filter.

35. The apparatus of claim 34, wherein:
the specific second-order digital recursive filter comprises:
a specific constant proportional loop coefficient; and
a specific constant integrating loop coefficient stored in an accumulator; and
the specific extrapolation function comprises a specific first-order polynomial comprising:
a specific first term coefficient comprising the sum of:
a product of the specific information component multiplied by the specific constant proportional loop coefficient,
the specific extrapolated information component, and
the specific common component; and
a specific second term coefficient comprising a product of the specific information component multiplied by the specific constant integrating loop coefficient.

36. The apparatus of claim 34, wherein:
the specific second-order digital recursive filter comprises:
a specific variable proportional loop coefficient dependent on a time elapsed from a specific starting time for tracking of a specific satellite; and
a specific variable integrating loop coefficient dependent on the time elapsed from the specific starting time for tracking of the specific satellite, wherein the specific variable integrating loop coefficient is stored in an accumulator; and
the specific extrapolation function comprises a specific first-order polynomial comprising:
a specific first term coefficient comprising the sum of:
a product of the specific information component multiplied by the specific variable proportional loop coefficient,
the specific extrapolated information component, and
the specific common component; and
a specific second term coefficient comprising a product of the specific information component multiplied by the specific variable integrating loop coefficient.

37. A non-transitory computer readable medium storing computer program instructions for extrapolating base data corresponding to a base, the computer program instructions defining the steps of:
receiving the base data at a rover receiver, the base data comprising:
a plurality of base parameters, each specific base parameter in the plurality of base parameters corresponding to a specific navigation satellite selected from a plurality of navigation satellites and corresponding to a specific base epoch selected from a plurality of base epochs;
receiving a plurality of satellite orbit parameters at the rover receiver, each specific satellite orbit parameter in the plurality of satellite orbit parameters corresponding to a specific navigation satellite selected from the plurality of navigation satellites;
calculating for each specific navigation satellite and for each specific base epoch a specific computed component;
calculating for each specific base epoch a specific common component;
calculating for each specific navigation satellite and for each specific base epoch a specific information component;
calculating for each specific information component and for each specific base epoch a specific extrapolation function;
calculating for each specific information component a specific extrapolated information component extrapolated to a rover epoch referenced to a clock in the rover receiver, wherein the specific extrapolated information component is calculated from:
at least one base parameter received at the rover receiver prior to the rover epoch; and
the specific extrapolation function;
calculating for each specific navigation satellite a specific updated computed component at the rover epoch; and
calculating for each specific navigation satellite the sum of the extrapolated specific information component at the rover epoch, the updated computed component at the rover epoch, and the common component.

38. The non-transitory computer readable medium of claim 37, wherein:
the base parameters comprise base pseudo-ranges.

39. The non-transitory computer readable medium of claim 38, wherein the computer program instructions defining the step of calculating for each specific navigation satellite and for each specific base epoch a specific computed component comprise computer program instructions defining the steps of:
calculating a specific first base range between the base and the specific navigation satellite corresponding to the specific base epoch;
calculating a specific second base range between the base and the specific navigation satellite corresponding to the base epoch prior to the specific base epoch; and
subtracting the specific second base range from the specific first base range.

40. The non-transitory computer readable medium of claim 38, wherein the computer program instructions defining the step of calculating for each specific base epoch a specific common component comprise computer program instructions defining the steps of:
calculating a plurality of source pseudo-range differences, each specific source pseudo-range difference corresponding to a specific navigation satellite; and
weight averaging over all navigation satellites the plurality of source pseudo-range differences.

41. The non-transitory computer readable medium of claim 40, wherein the computer program instructions defining the step of weight averaging over all navigation satellites the plurality of source pseudo-range differences comprise computer program instructions defining the step of multiplying each source pseudo-range difference by one of:
a specific constant weight coefficient; and
a specific weight coefficient comprising the sine of an elevation angle of the specific navigation satellite.

42. The non-transitory computer readable medium of claim 38, wherein the computer program instructions defining the step of calculating for each specific base epoch a specific common component comprise computer program instructions defining the stews of:
calculating a plurality of pseudo-range differences, each specific pseudo-range difference corresponding to a specific navigation satellite;
calculating a plurality of pseudo-range increments by subtracting the specific computed component from each specific pseudo-range difference; and
weight averaging over all navigation satellites the plurality of pseudo-range increments.

43. The non-transitory computer readable medium of claim 42, wherein the computer program instructions defining the step of weight averaging over all navigation satellites the plurality of pseudo-range increments comprise computer program instructions defining the step of multiplying each pseudo-range increment by one of:
a specific constant weight coefficient; and
a specific weight coefficient comprising the sine of an elevation angle of the specific navigation satellite.

44. The non-transitory computer readable medium of claim 38, wherein the computer program instructions defining the step of calculating for each specific information component a specific extrapolation function comprise computer program instructions defining the step of calculating one of:
a specific first-order polynomial function; and
a specific second-order polynomial function.

45. The non-transitory computer readable medium of claim 37, wherein:
the base parameters comprise base full phases.

46. The non-transitory computer readable medium of claim 45, wherein the computer program instructions defining the step of calculating for each specific navigation satellite and for each specific base epoch a specific computed component comprise computer program instructions defining the steps of:
calculating a specific first base range between the base and the specific navigation satellite corresponding to the specific base epoch;
calculating a specific second base range between the base and the specific navigation satellite corresponding to the base epoch prior to the specific base epoch;
calculating a specific base range increment by subtracting the specific second base range from the specific first base range; and
dividing the specific base range increment by a specific carrier wavelength.

47. The non-transitory computer readable medium of claim 45, wherein the computer program instructions defining the step of calculating for each specific base epoch a specific common component comprise computer program instructions defining the steps of:
calculating a plurality of source phase differences, each specific source phase difference corresponding to a specific navigation satellite; and
weight averaging over all navigation satellites the plurality of source phase differences.

48. The non-transitory computer readable medium of claim 47, wherein the computer program instructions defining the step of weight averaging over all navigation satellites the plurality of source phase differences comprise computer program instructions defining the step of multiplying each specific source phase difference by one of:
a specific constant weight coefficient; and
a specific weight coefficient comprising the sine of an elevation angle of the specific navigation satellite.

49. The computer readable medium of claim 45, wherein the computer program instructions defining the step of calculating for each specific base epoch a specific common component comprise computer program instructions defining the steps of:
calculating a plurality of full phase differences, each specific full phase difference corresponding to a specific navigation satellite;
calculating a plurality of full phase increments by subtracting the specific computed component from each specific full phase difference; and
weight averaging over all navigation satellites the plurality of full phase increments.

50. The non-transitory computer readable medium of claim 49, wherein the computer program instructions defining the step of weight averaging over all navigation satellites the plurality of full phase increments comprise computer program instructions defining the step of multiplying each full phase increment by one of:
a specific constant weight coefficient; and
a specific weight coefficient comprising the sine of an elevation angle of the specific navigation satellite.

51. The non-transitory computer readable medium of claim 45, wherein the computer program instructions defining the step of calculating for each specific information component a specific extrapolation function comprise computer program instructions defining the step of calculating one of:
- a specific first-order polynomial function; and
- a specific second-order polynomial function.

52. The non-transitory computer readable medium of claim 37, wherein the computer program instructions defining the step of calculating for each specific information component a specific extrapolation function comprise computer program instructions defining the step of calculating one of:
- the specific extrapolation function with a specific second-order digital recursive filter; and
- the specific extrapolation function with a specific third-order digital recursive filter.

53. The non-transitory computer readable medium of claim 52, wherein:
- the specific second-order digital recursive filter comprises:
  - a specific constant proportional loop coefficient; and
  - a specific constant integrating loop coefficient stored in an accumulator; and
- the specific extrapolation function comprises a specific first-order polynomial comprising:
  - a specific first term coefficient comprising the sum of:
    - a product of the specific information component multiplied by the specific constant proportional loop coefficient,
    - the specific extrapolated information component, and
    - the specific common component; and
  - a specific second term coefficient comprising a product of the specific information component multiplied by the specific constant integrating loop coefficient.

54. The non-transitory computer readable medium of claim 52, wherein:
- the specific second-order digital recursive filter comprises:
  - a specific variable proportional loop coefficient dependent on a time elapsed from a specific starting time for tracking of a specific satellite; and
  - a specific variable integrating loop coefficient dependent on the time elapsed from the specific starting time for tracking of the specific satellite, wherein the specific variable integrating loop coefficient is stored in an accumulator; and
- the specific extrapolation function comprises a specific first-order polynomial comprising:
  - a specific first term coefficient comprising the sum of:
    - a product of the specific information component multiplied by the specific variable proportional loop coefficient,
    - the specific extrapolated information component, and
    - the specific common component; and
  - a specific second term coefficient comprising a product of the specific information component multiplied by the specific variable integrating loop coefficient.

* * * * *

UNITED STATES PATENT AND TRADEMARK OFFICE
CERTIFICATE OF CORRECTION

Page 1 of 1

PATENT NO. : 8,319,683 B2
APPLICATION NO. : 12/579485
DATED : November 27, 2012
INVENTOR(S) : Mark I. Zhodzishsky et al.

It is certified that error appears in the above-identified patent and that said Letters Patent is hereby corrected as shown below:

In the Specification

Column 3, line 20, "relative to delay $\mu_d$, rover 140" should read -- relative to delay $\tau_d$, rover 140 --

Column 3, line 24, "are processed at $t_1 261$-$t_6\ 266$" should read -- are processed at $t'_1 261$ - $t'_6 266$ --

Column 9, line 54, "the weight coefficients of satellites" should read -- the weight coefficients of satellites $w_{i,j}$ --

Column 10, line 28, "$\delta\phi_{i,j} = d\phi^{i,j} = \Delta\phi_i^q$" should read -- $\delta\phi_{i,j} = d\phi_{i,j} - \Delta\phi_i^q$ --

Column 11, line 29, "representing $f_{i,1},\ f_{i,2},\ f_{i,N}$, respectively" should read -- representing $f_{i,1},\ f_{i,2},\ ...,\ f_{i,j},\ ...,\ f_{i,N}$, respectively --

Signed and Sealed this
Second Day of December, 2014

Michelle K. Lee
*Deputy Director of the United States Patent and Trademark Office*